United States Patent
Cozzo et al.

(10) Patent No.: US 12,452,028 B2
(45) Date of Patent: Oct. 21, 2025

(54) APPARATUSES AND METHODS FOR DUPLEX OPERATION

(71) Applicant: Samsung Electronics Co., Ltd., Suwon-si (KR)

(72) Inventors: Carmela Cozzo, San Diego, CA (US); Marian Rudolf, Longueuil (CA); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 17/820,853

(22) Filed: Aug. 18, 2022

(65) Prior Publication Data

US 2023/0076137 A1 Mar. 9, 2023

Related U.S. Application Data

(60) Provisional application No. 63/241,269, filed on Sep. 7, 2021.

(51) Int. Cl.
*H04L 5/14* (2006.01)
*H04L 5/00* (2006.01)
(Continued)

(52) U.S. Cl.
CPC .......... *H04L 5/14* (2013.01); *H04L 5/0048* (2013.01); *H04L 5/0092* (2013.01);
(Continued)

(58) Field of Classification Search
CPC ....... H04L 5/14; H04L 5/0048; H04L 5/0092; H04W 72/21; H04W 72/23
See application file for complete search history.

(56) References Cited

U.S. PATENT DOCUMENTS

2019/0305923 A1  10/2019  Luo et al.
2020/0021421 A1   1/2020  Han et al.
(Continued)

FOREIGN PATENT DOCUMENTS

WO  2020064176 A1  4/2020
WO  2020145747 A1  7/2020
WO  2021141444 A1  7/2021

OTHER PUBLICATIONS

"5G; NR; Physical channels and modulation (3GPP TS 38.211 version 16.4.0 Release 16)", ETSI TS 138 211 V16.4.0, Jan. 2021, 137 pages.
(Continued)

*Primary Examiner* — Siming Liu

(57) ABSTRACT

Methods and apparatuses for duplex operation in a wireless communication system. A method for operating a user equipment (UE) includes receiving, for a cell, first information indicating first slots with uplink (UL), downlink (DL), or flexible (F) symbols associated with a first bandwidth (BW) and second information indicating second slots with UL, DL, or F symbols associated with a second BW. The second slots are a subset of the first slots. The method further includes determining a first direction for a first set of symbols of the first slots based on the first information and a second direction for a second set of symbols of the second
(Continued)

slots based on the first information and the second information. The method further includes transmitting or receiving over the first set of symbols and over the second set of symbols.

17 Claims, 16 Drawing Sheets

(51) Int. Cl.
  *H04W 72/0446* (2023.01)
  *H04W 72/0453* (2023.01)
  *H04W 72/21* (2023.01)
  *H04W 72/23* (2023.01)

(52) U.S. Cl.
  CPC ... *H04W 72/0446* (2013.01); *H04W 72/0453* (2013.01); *H04W 72/21* (2023.01); *H04W 72/23* (2023.01)

(56) References Cited

U.S. PATENT DOCUMENTS

| 2020/0274687 | A1* | 8/2020 | Kim | H04L 5/0096 |
| 2021/0051655 | A1* | 2/2021 | Lee | H04W 72/0446 |
| 2021/0274480 | A1 | 9/2021 | Takeda et al. | |
| 2022/0132563 | A1 | 4/2022 | Kim et al. | |
| 2023/0080106 | A1 | 3/2023 | Ji et al. | |

OTHER PUBLICATIONS

"5G; NR; Multiplexing and channel coding (3GPP TS 38.212 version 16.4.0 Release 16)", ETSI TS 138 212 V16.4.0, Jan. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
"5G; NR; Radio Resource Control (RRC); Protocol specification (3GPP TS 38.331 version 16.3.1 Release 16)", ETSI TS 138 331 V16.3.1, Jan. 2021, 916 pages.
Extended European Search Report issued Sep. 26, 2024 regarding Application No. 22867654.0, 9 pages.
International Search Report and Written Opinion issued Dec. 9, 2022 regarding International Application No. PCT/KR2022/013312, 7 pages.

* cited by examiner

APPARATUSES AND METHODS FOR DUPLEX OPERATION

CROSS-REFERENCE TO RELATED APPLICATION AND CLAIM OF PRIORITY

This application claims priority under 35 U.S.C. § 119(e) to U.S. Provisional Patent Application No. 63/241,269 filed on Sep. 7, 2021. The above-identified provisional patent applications are hereby incorporated by reference in their entirety.

TECHNICAL FIELD

The present disclosure relates generally to wireless communication systems and, more specifically, the present disclosure relates to enabling duplex operation.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to methods and apparatuses for duplex operation.

In one embodiment, a user equipment (UE) is provided. The UE includes a transceiver and a processor operably coupled to the transceiver. The transceiver is configured to receive, for a cell, first information indicating first slots with uplink (UL), downlink (DL), or flexible (F) symbols associated with a first bandwidth (BW) and second information indicating second slots with UL, DL, or F symbols associated with a second BW. The second slots are a subset of the first slots. The processor is configured to determine a first direction for a first set of symbols of the first slots based on the first information and a second direction for a second set of symbols of the second slots based on the first information and the second information. The transceiver is further configured to transmit or receive over the first set of symbols and over the second set of symbols.

In another embodiment, a base station (BS) is provided. The BS includes a transceiver and a processor operably coupled to the transceiver. The BS is configured to transmit, for a cell, first information indicating first slots with UL, DL, or F symbols associated with a first BW and second information indicating second slots with UL, DL, or F symbols associated with a second BW. The second slots are a subset of the first slots. The processor is configured to determine a first direction for a first set of symbols of the first slots based on the first information and a second direction for a second set of symbols of the second slots based on the first information and the second information. The transceiver is further configured to receive or transmit over the first set of symbols and over the second set of symbols.

In yet another embodiment, a method is provided. The method includes receiving, for a cell, first information indicating first slots with UL, DL, or F symbols associated with a first BW and second information indicating second slots UL, DL, or F symbols associated with a second BW. The second slots are a subset of the first slots. The method further includes determining a first direction for a first set of symbols of the first slots based on the first information and a second direction for a second set of symbols of the second slots based on the first information and the second information. The method further includes transmitting or receiving over the first set of symbols and over the second set of symbols.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
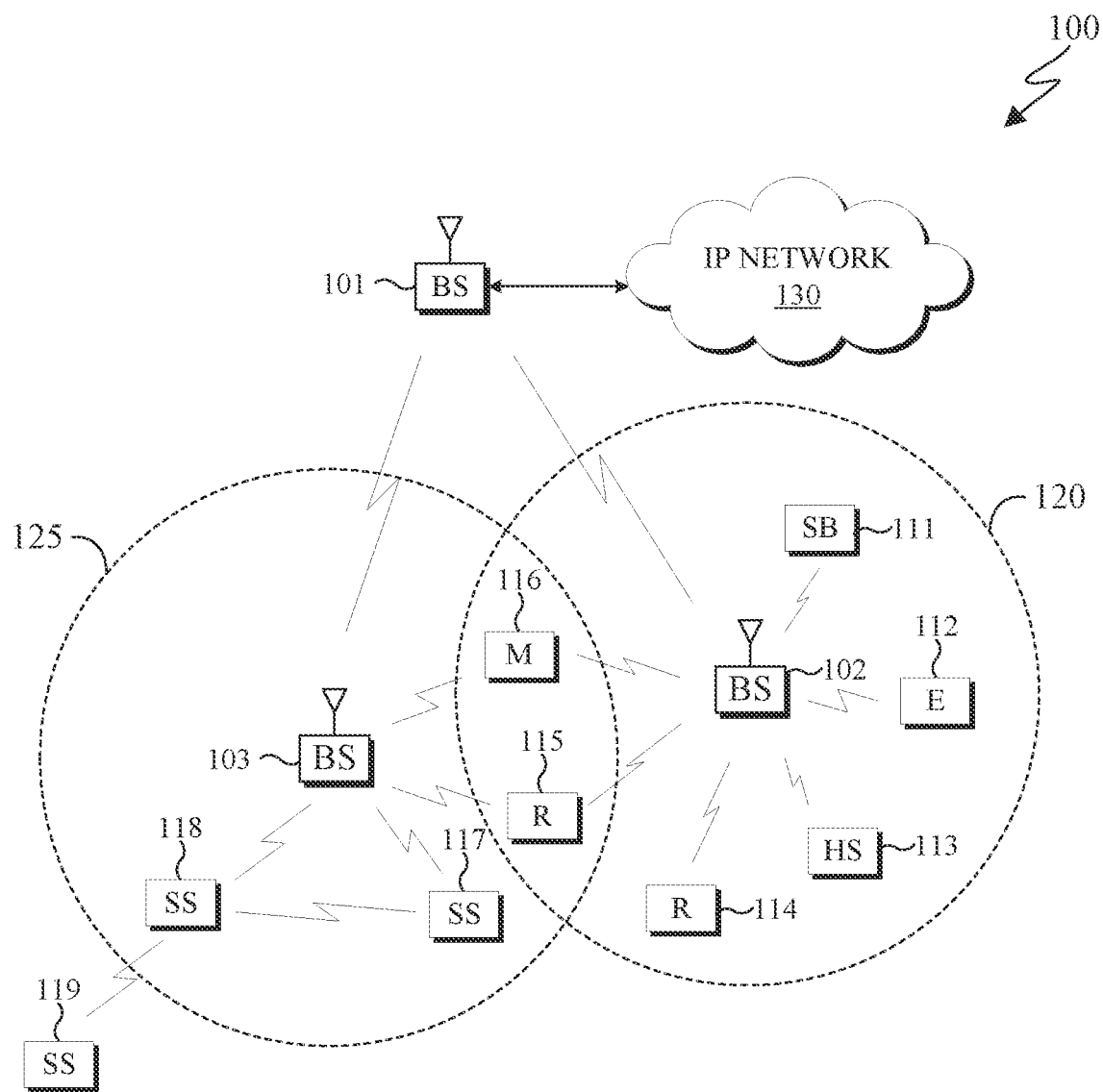
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0, "NR; Physical channels and modulation" ("REF1"); 3GPP TS 38.212 v16.4.0, "NR; Multiplexing and Channel coding" ("REF2"); 3GPP TS 38.213 v16.4.0, "NR; Physical Layer Procedures for Control" ("REF3"); 3GPP TS 38.214 v16.4.0, "NR; Physical Layer Procedures for Data" ("REF4"); 3GPP TS 38.321 v16.3.0, "NR; Medium Access Control (MAC) protocol specification" ("REF5"); and 3GPP TS 38.331 v16.3.1, "NR; Radio Resource Control (RRC) Protocol Specification" ("REF6").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in both radio interface efficiency and coverage are important.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Certain embodiments of present disclosure relate generally to wireless communication systems and, more specifically, to supporting duplex transmissions and receptions by a UE.

Figure 2:
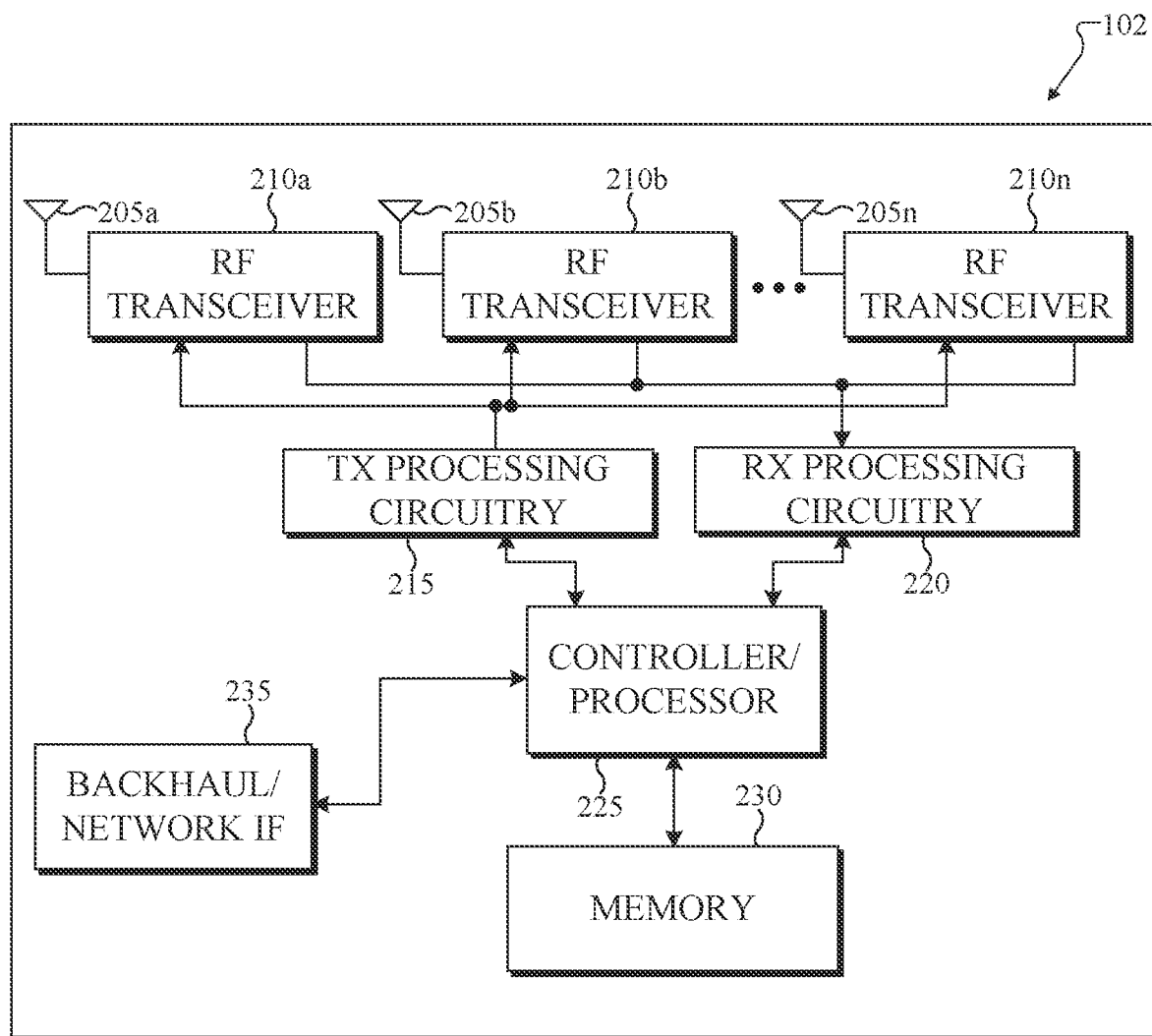
FIG. 2 illustrates an example base station (BS) according to embodiments of the present disclosure.
Figure 3:
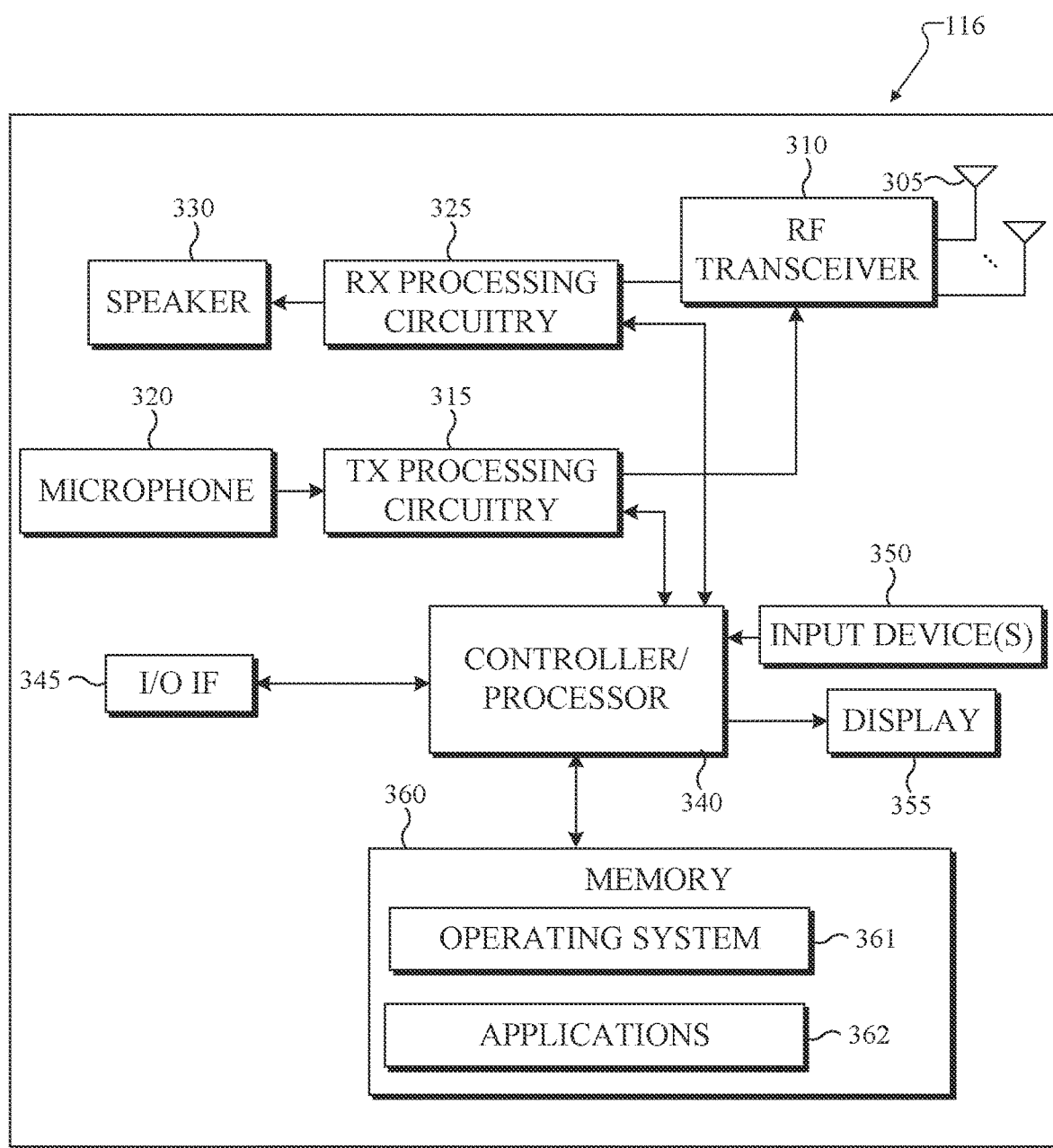
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (gNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of UEs within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 enable duplex operation. Additionally, as described in more detail below, one or more of the UEs 111-119 include circuitry, circuitry, programing, or a combination thereof for enabling duplex operation. In certain embodiments, and one or more of the BSs 101-103 includes circuitry, programing, or a combination thereof for enabling duplex operation.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support duplex operations. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an operating system. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
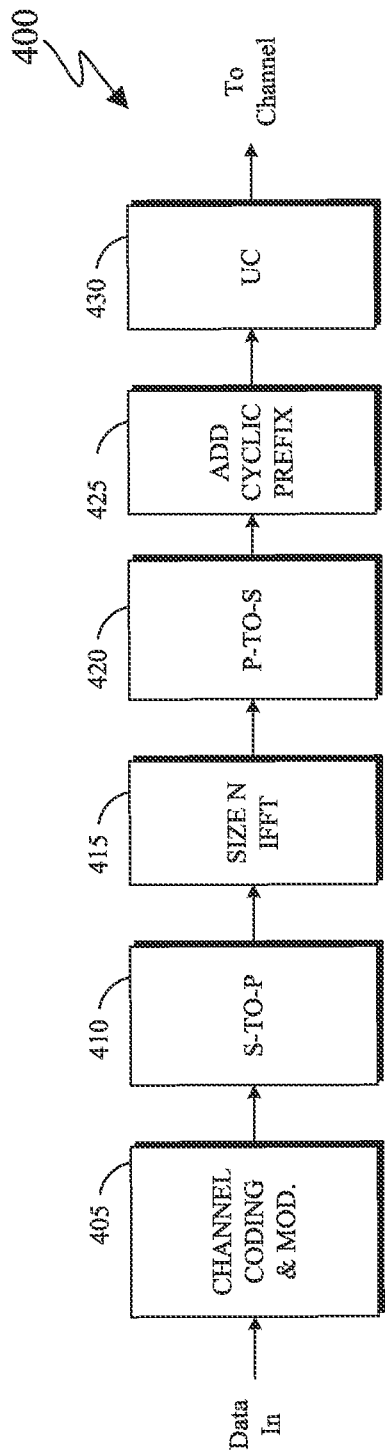
FIGS. 4 and 5 illustrate example wireless transmit and receive paths according to embodiments of the present disclosure.
Figure 5:
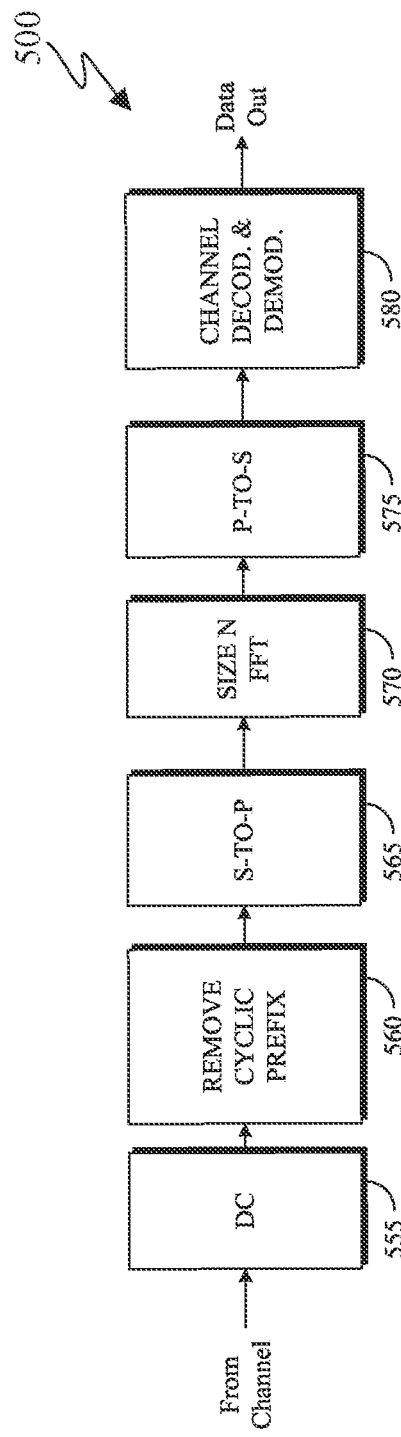

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support enabling a duplex operation as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A 4-step RA procedure, also known as a Type-1 (L1) random access procedure, includes (i) the transmission of a physical random access channel (PRACH) preamble (Msg1) by a UE (denoted as step-1), (ii) an attempt by the UE to receive a random access response (RAR) (or Msg2) (stated differently, a BS transmission of RAR message with a physical downlink control channel (PDCCH)/physical downlink shared channel (PDSCH) (Msg2)) (denoted as step-2), (iii) the transmission of a contention resolution message (Msg3) physical uplink shared channel (PUSCH) by the UE and when applicable, the transmission of a PUSCH scheduled by a RAR uplink (UL) grant (denoted as step-3), and (iv) the attempt by the UE to receive a contention resolution message (Msg4) (stated differently, BS transmission of a contention resolution message) (denoted as step-4).

Instead of a 4-step RA procedure, a 2-step RA procedure, also known as Type-1 (L1) random access procedure, can be used where a UE can transmit both a PRACH preamble and a PUSCH (MsgA) prior to reception of a corresponding RAR (MsgB).

A slot format includes downlink symbols, uplink symbols, and flexible symbols. If a UE is provided tdd-UL-DL-ConfigurationCommon, the UE sets the slot format per slot over a number of slots as indicated by tdd-UL-DL-ConfigurationCommon. The tdd-UL-DL-ConfigurationCommon provides a reference sub-carrier spacing (SCS) configuration $\mu_{ref}$ and a pattern1. The pattern1 provides a slot configuration period P associated to a reference SCS configuration, wherein the slot configuration period of P ms includes $s=P \cdot 2^{\mu ref}$ slots with SCS configuration $\mu_{ref}$, a number of downlink slots, a number of downlink symbols $d_{sym}$, a number of uplink slots $\mu_{slots}$ and a number of uplink symbols $\mu_{sys}$. In a slot configuration period p there are S slots, of which the first $d_{slots}$ slots are downlink and the last $\mu_{slots}$ are uplink. The symbols after the $d_{sym}$ downlink symbols after the $d_{slots}$ slots and before the $\mu_{sym}$ symbols before the $\mu_{slots}$ are flexible symbols. When configured with tdd-UL-DL-ConfigurationCommon, the UE may be provided with 2 patterns pattern1 and pattern2 with slot configuration periods P1 and P2 respectively. The periods P1 and P2 may be different, but the UE expects that P1+P2 divides 20 ms. Each period includes a number of slots. If configured with 2 patterns, the UE sets the slot format per slot over a first number of slots as indicated by pattern1 and the UE sets the slot format per slot over a second number of slots as indicated by pattern2. The flexible symbols are determined for each pattern from the downlink and uplink slots and the downlink and uplink symbols of each pattern. A given pattern provided by tdd-UL-DL-ConfigurationCommon only allows for a single DL-UL switching point per slot configuration period. The use of 2 patterns allows to configure 2 such switching points and therefore adds flexibility to DL-UL slot assignments.

If the UE (such as the UE 116) is additionally provided tdd-UL-DL-ConfigurationDedicated, the parameter tdd-UL-DL-ConfigurationDedicated overrides only flexible symbols per slot over the number of slots as provided by tdd-UL-DL-ConfigurationCommon. A slot configuration period and a number of downlink symbols, uplink symbols, and flexible symbols in each slot of the slot configuration period are determined from tdd-UL-DL-ConfigurationCommon and tdd-UL-DL-ConfigurationDedicated and are common to each configured BWP. A UE considers symbols in a slot indicated as downlink by tdd-UL-DL-ConfigurationCommon, or tdd-UL-DL-ConfigurationDedicated to be available for receptions and considers symbols in a slot indicated as uplink by tdd-UL-DL-ConfigurationCommon, or by tdd-UL-DL-ConfigurationDedicated to be available for transmissions.

An NR TDD component carrier (CC) is a single carrier which uses the same frequency band for the uplink and the downlink. TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions, DL is typically assigned most time resources in TDD to handle DL-heavy mobile traffic. Another advantage is that channel state information (CSI) can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request (HARQ) acknowledgement (ACK) information associated with DL receptions is typically larger than that ire FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a physical uplink control channel (PUCCH) providing HARQ-ACK information needs to be transmitted with repetitions in order to improve coverage an alternative in such case is for a network to forgo HARQ-ACK information at least for some transport blocks in the DL).

To address some of the disadvantages for TDD operation, a dynamic adaptation of link direction has been considered where, with the exception of some symbols in some slots supporting predetermined transmissions such as for synchronization signal (SS) physical broadcast channel (ITCH) (SS/PBCH Block (SSBs)), symbols of a slot can have a flexible direction (UL or DL) that a UE can determine according to scheduling information for transmissions or receptions. A PDCCH can also be used to provide a downlink control information (DCI) format, such as a DL) format 2_0 as described in REF3, that can indicate a link direction of some flexible symbols in one or more slots. Nevertheless, in actual deployments, it is difficult for a gNB scheduler to adapt a transmission direction of symbols without coordination with other gNB schedulers in the network. This is because of cross-link interference (CLI) where, for example, DL receptions in a cell by a UE can experience large interference from UL transmissions in the same or neighboring cells from other UEs.

Full-duplex (ED) communications offer a potential for increased spectral efficiency, improved capacity, and reduced latency in wireless networks. When using ED communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused or only respective subsets can be active for transmissions and receptions when FD communication is enabled.

Instead of using a single carrier, it is also possible to use different CCs for receptions and transmissions by a UE. For example, receptions by a UE can occur on a first CC and transmissions by the UE occur on a second CC having a small, including zero, frequency separation from the first CC.

Furthermore, a gNB (such as BS 102 can operate with full-duplex mode even when a UE still operates in half-duplex mode, such as when the UE can either transmit or receive at a same time, or the UE can also be capable for full-duplex operation.

Full-duplex transmission/reception is not limited to cNBs, TRPS, or CBEs, but can also be used for other types of wireless nodes such as relay or repeater nodes.

Full duplex operation needs to overcome several challenges in order to be functional in actual deployments. When using overlapping frequency resources, received signals are subject to co-channel CLI and self-interference, CLI and self-interference cancellation methods include passive methods that rely on isolation between transmit and receive antennas, active methods that utilize RE or digital signal processing, and hybrid methods that use a combination of active and passive methods. Filtering and interference cancellation may be implemented in RF, baseband (BB), or in both RF and BB. While mitigating co-channel CU may require large complexity at a receiver, it is feasible within current technological limits. Another aspect of ED operation is the mitigation of adjacent channel CLI because in several cellular band allocations, different operators have adjacent spectrum.

Throughout the disclosure, Cross-Division-Duplex (XDD) is used as a short form for a half-duplex operation or a full-duplex or a duplex operation. As such, the terms XDD, half-duplex and full-duplex are interchangeably used in the disclosure.

Full-duplex operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDSU (2.5 msec), DDDDDDD-SUU (5 msec), the UL-DL configurations allow for an DL:UL ratio from 3:1 to 4:1, Any UL transmission can only occur in a limited number of UL slots, for example every 2, 2.5, or 5 msec, respectively.

To improve uplink coverage and reduce latency, a XDD scheme can be used to enable simultaneous DL and UL operation within a TDD carrier by using different TDD configurations across different frequency regions of a. BWP. In a single slot, frequency resources of a BWP are partitioned, and some subcarriers or sub-band(s) are configured for uplink and some other subcarriers or sub-band(s) are configured for downlink. When multiple BWPs are active, in a single slot a portion of frequency resources configured for either uplink or downlink can be a BWP, or one or more sub-bands or groups of subcarriers of one or more BWPs, or also a BWP and a sub-band of a different BWP. In FD operation a UE (such as the UE 116) is allowed to transmit and receive in the different configured subcarriers of a BWP at the same time, while in half-duplex (HD) operation the UE can either transmit or receive in the corresponding configured subcarriers of a BWP at the same time. A gNB operates in FD mode independently of whether the UE operates in FD or HD mode.

Accordingly, embodiments of the present disclosure take into consideration that there is a need to determine an operation in XDD mode based on a configuration. Embodiments of the present disclosure also take into consideration that there is another need to determine an operation in XDD mode based on a configuration and a dynamic/L1 signaling.

Throughout the disclosure, a UE (such as the UE 116) operating in full-duplex (HD) or half-duplex (HD) mode is also referred as an XDD UE. The terms "full-duplex", "half-duplex" and "XDD" are used interchangeably in this disclosure to refer to simultaneous DL and UL operation within a TDD carrier by using different TDD configurations across different frequency regions of a BWP, or across different sub-bands of one or more BWP, or also different frequency regions of different BWPs, wherein a frequency region can comprise part or all of the subcarriers of a BWP.

Embodiments of the present disclosure describe configuring an X slot. This is described in the following examples and embodiments, such as those of FIGS. 6-8.

Figure 6:
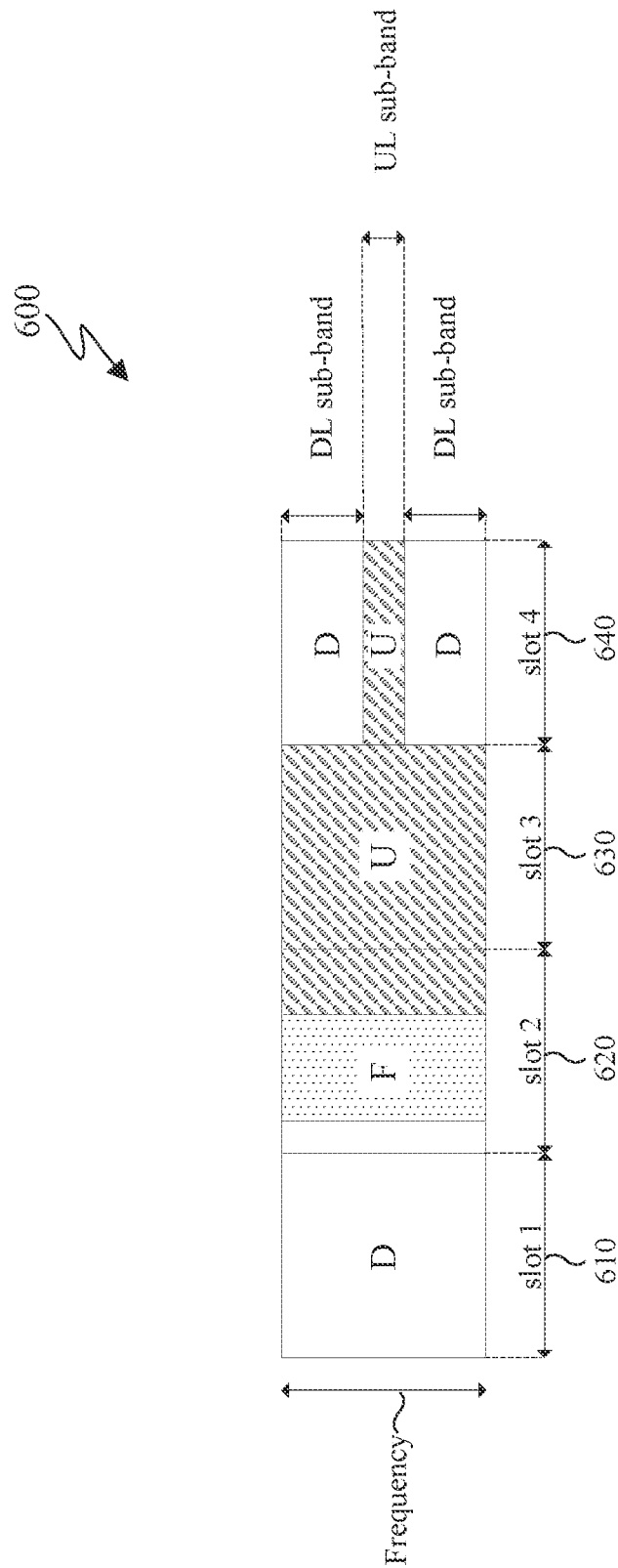
FIGS. 6-8 illustrate example diagrams of slots according to embodiments of the present disclosure.
Figure 7:
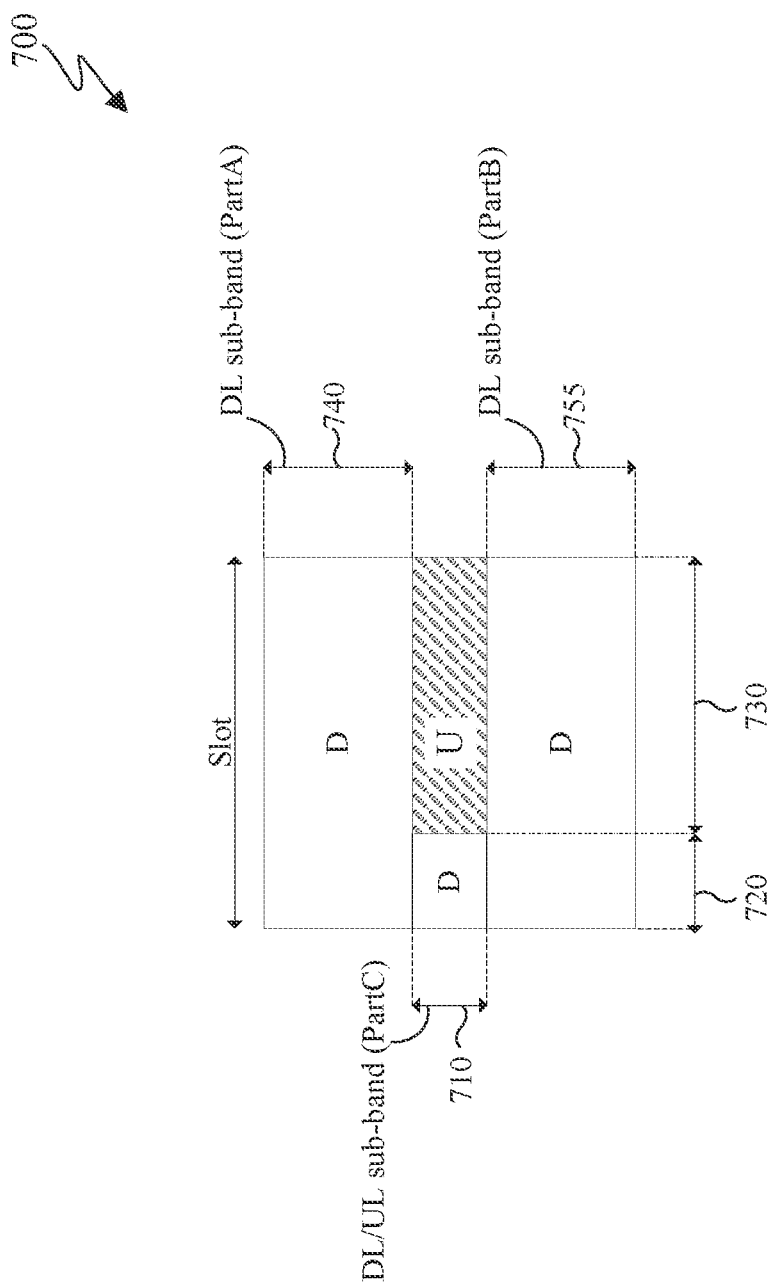
Figure 8:
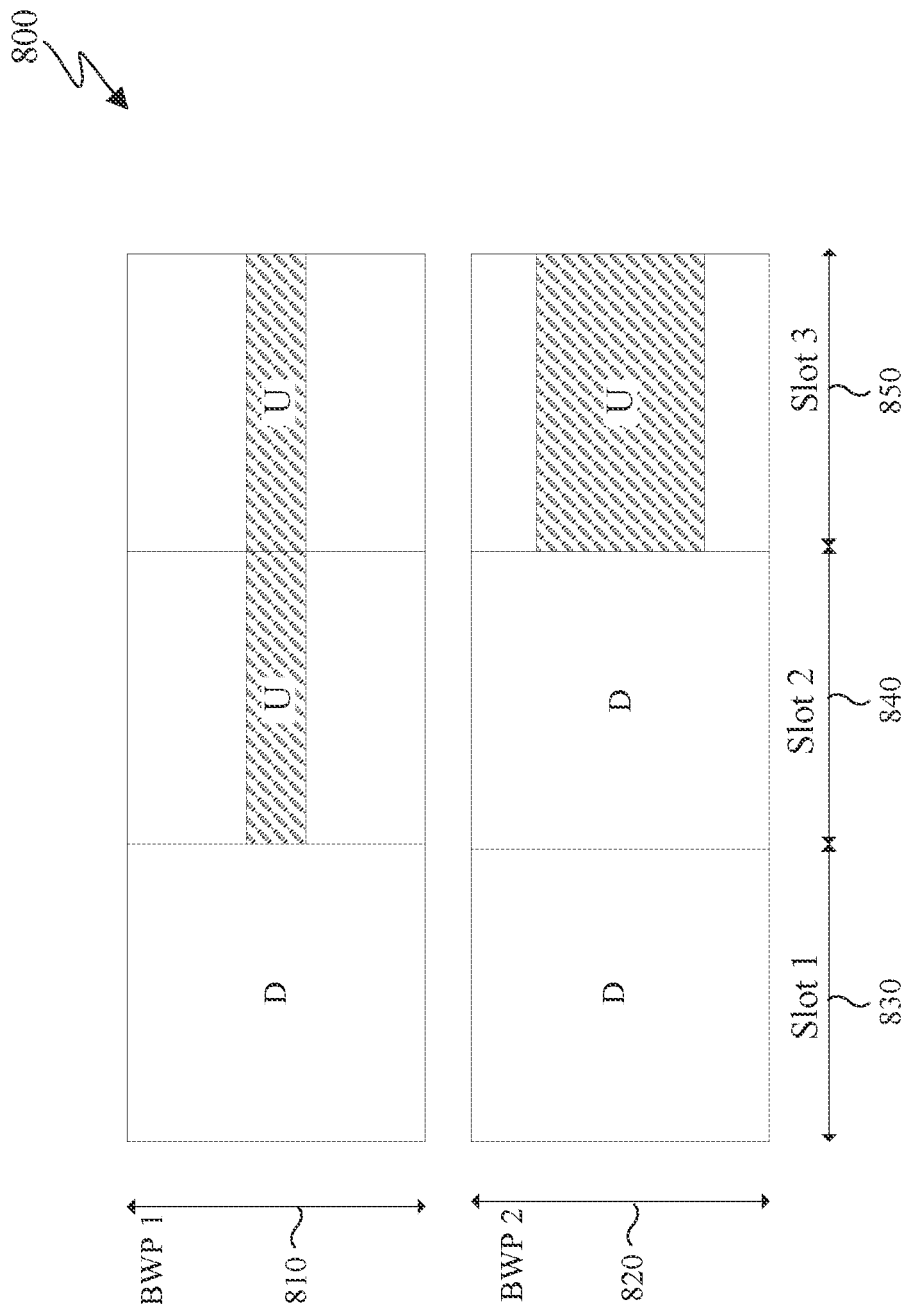

FIGS. 6-8 illustrate example diagrams 600, 700, and 800, respectively, of slots according to embodiments of the present disclosure. FIGS. 6-8 are for illustration only and other embodiments can be used without departing from the scope of the present disclosure. Although FIGS. 6-8 illustrate various slot configurations, various changes may be made to FIGS. 6-8.

When a UE (such as the UE 116) is provided a TDD UL-DL configuration, a slot can be a downlink slot with all downlink symbols, or an uplink slots with all uplink symbols, or a slot with downlink, and/or flexible symbols, and/or uplink symbols.

As illustrated in FIG. 6, a slot can be configured with all downlink symbols 610, or with downlink symbols, flexible symbols and uplink symbols 620, or with all uplink symbols 630, wherein each symbol comprises any of the frequency resources in a configured BWP. It is also possible that frequency resources in a BWP are partitioned, and some subcarriers or sub-bands are for uplink and some others are for downlink over a same time period. A partition of a BWP can be per slot 640, wherein each symbol of a slot can be either a DL symbol in the sub-band of a DL BWP or an UL symbol in the sub-band of an UL BWP. A slot where there is at least one sub-band for UL and one sub-band for DL is called an X slot. One or more sub-bands for uplink and one or more sub-bands for downlink can occupy different parts of a BWP. For example, a sub-band for uplink can occupy the middle portion of the BWP and the downlink sub-bands can occupy the lower and higher parts of a BWP. Uplink and downlink sub-bands can have different sizes. For example, for a BWP of 100 MHz, DL/UL/DL sub-bands can be 40/20/40 MHz, respectively. It is also possible that lower frequencies of a BWP are UL and higher frequencies are DL, or vice versa, and the two sub-bands have same or different size. For example, for a BWP of 100 MHz, UL/DL sub-bands can be 20/80 or 40/60 or 50/50 MHz or else.

When a UE is configured for operation in FD or HD or XDD mode, each symbol of an X slot can either be an uplink symbol or a downlink symbol, wherein the uplink symbol can be scheduled in corresponding UL frequency resources and the downlink symbol can be scheduled in corresponding DL frequency resources. For example, in slot 4 of FIG. 6 when a UE is scheduled to transmit a PUSCH over 14 symbols using frequency resources from the UL sub-band, the UE does not expect to receive in any of the frequency resources for downlink in the slot. In another example, in slot 4 of FIG. 6 the UE can be scheduled to receive in the first 4 symbols in frequency resources of the DL sub-bands and to transmit in symbols 5 to 14 in frequency resources of the UL sub-band. Guard subcarriers or resource blocks (RBs) can also be included between a DL sub-band and an UL sub-band. A DL sub-band and an UL sub-band may be separated by a configurable or known guard region in frequency-domain to increase frequency separation and improve demodulation performance when a UE or a gNB concurrently processes DL and UL signals or channels.

When a UE is configured for operation in XDD mode, symbols of a slot can have different directions for a same sub-band. As illustrated in FIG. 7, a sub-band C of a BWP 710 can be scheduled for either UL or DL, and in a same slot some symbols are DL 720 and some other symbols are UL 730. For example, symbols 1 to 4 are DL symbols, symbol 5 is not used to allow UL/DL transition, and symbols 6 to 14 are UL symbols. DL symbols 1 to 4 can occupy any frequency resources from all 3 sub-bands, while UL symbols 6 to 14 can only occupy frequency resources in sub-band C. In another example, a DL transmission over 14 symbols can occupy any of the DL frequencies of the BWP in symbols 1 to 4 and occupy frequencies in sub-band A and/or in sub-band B. For an X slot configured as in FIG. 7 it is not possible to transmit a PUSCH with 14 symbols.

A UE can be configured by higher layers multiple UL BWPs and multiple DL BWPs, and one or more UL BWP and one or more DL BWP can be active at any time. The allocation of frequencies for UL or DL can be same or different in different active BWPs, can be same or different over a number of slots, and can change with a same or different periodicity. The active BWPs can have a different size and the allocation of frequencies for UL or for DL can be same or different. For example, for a given slot and for two BWPs with BWP-1 larger than BWP-2, a size of a DL sub-band in BWP-1 is same as the full BWP-2 which is for DL, and the remaining frequencies in BWP-1 are for UL. In another example the size of UL frequencies is the same in BWP-1 and BWP-2. An example with BWPs of a same size is illustrated in FIG. 8, wherein a UE is configured with two active BWPs and a transmission or reception in a symbol can be in frequencies of one or both of BWP-1 810 and BWP-2 820. In slot 1 830 all symbols are DL symbols and can occupy any of the frequency resources in BWP-1 and BWP-2. In slot 2 840 UL frequencies are a sub-band of BWP-1. In slot 3 850 UL frequencies comprise a sub-band of BWP-1 and a sub-band of BWP-2, wherein the UL sub-band of BWP-2 occupies a different portion of the full BWP-2 with respect to the UL sub-band of BWP-1. For both BWP-1 and BWP-2 in slot 3, the center frequency of the UL sub-band is same as the center frequency of the full DL BWP. It is also possible that the center frequencies of the sub-band and the full BWP are different. For example, the UL sub-band in BWP-2 can be half the size of the DL BWP-2 comprising frequencies in the lower part of the band. Therefore, when multiple BWPs are active in XDD, a slot configuration period and a number of downlink symbols, uplink symbols, flexible symbols, and XDD symbols in each slot of the slot configuration period are determined from a configuration and are not common to each configured BWP.

Embodiments of the present disclosure also describe configurations that overrides downlink symbols as XDD symbols. This is described in the following examples and embodiments, such as those of FIGS. 9A-12.

Figure 10:
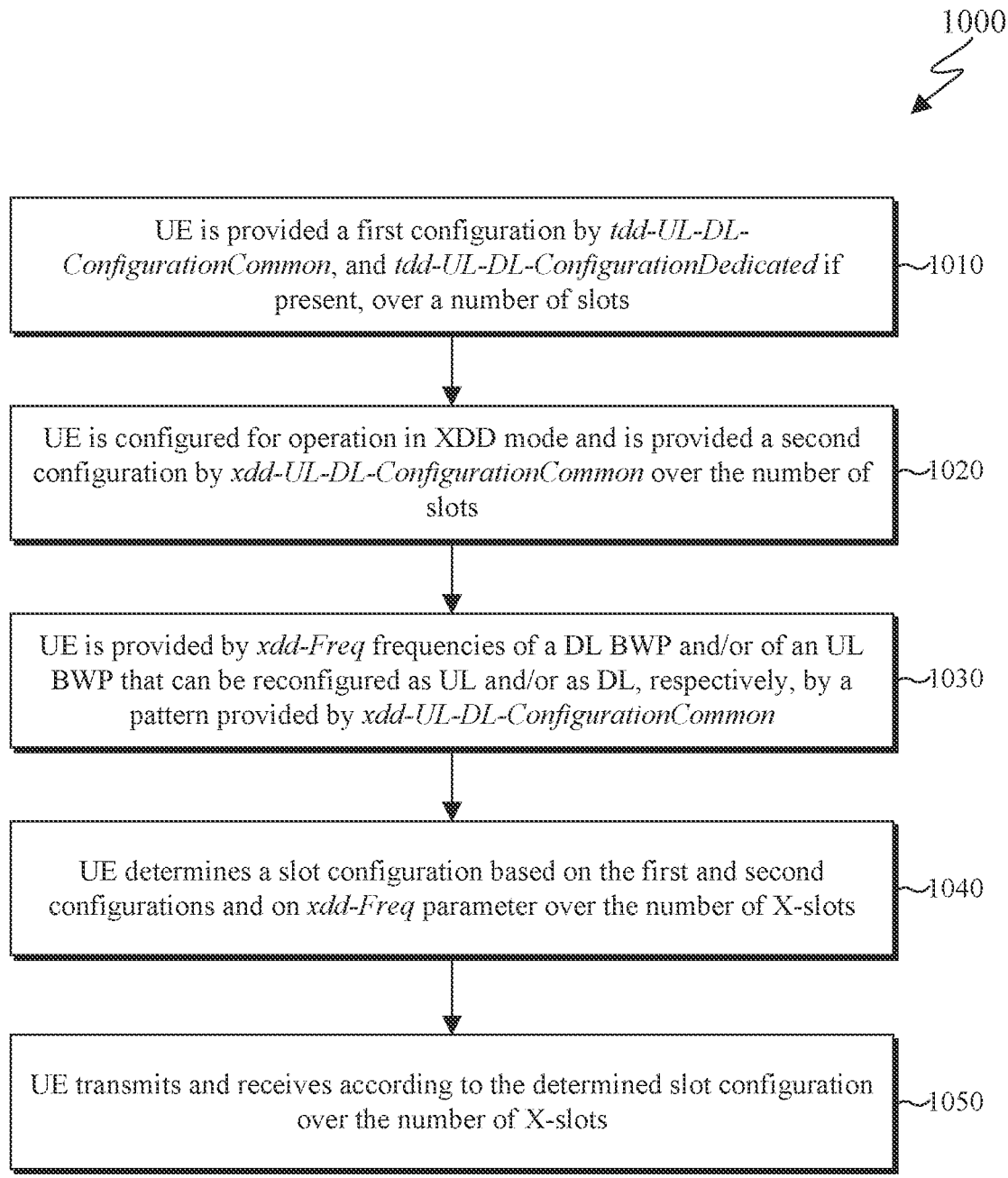
FIGS. 10-12 illustrate example methods for a UE to determine a slot configuration according to embodiments of the present disclosure.
Figure 11:
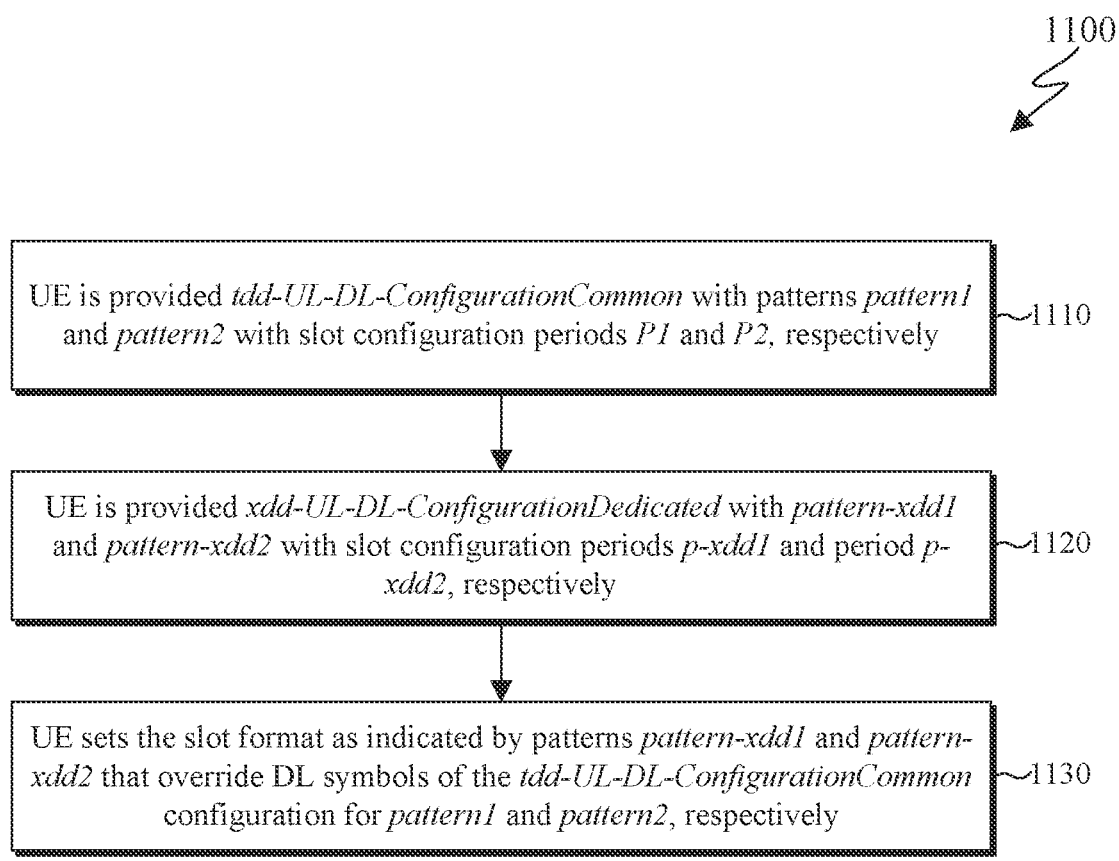
Figure 12:
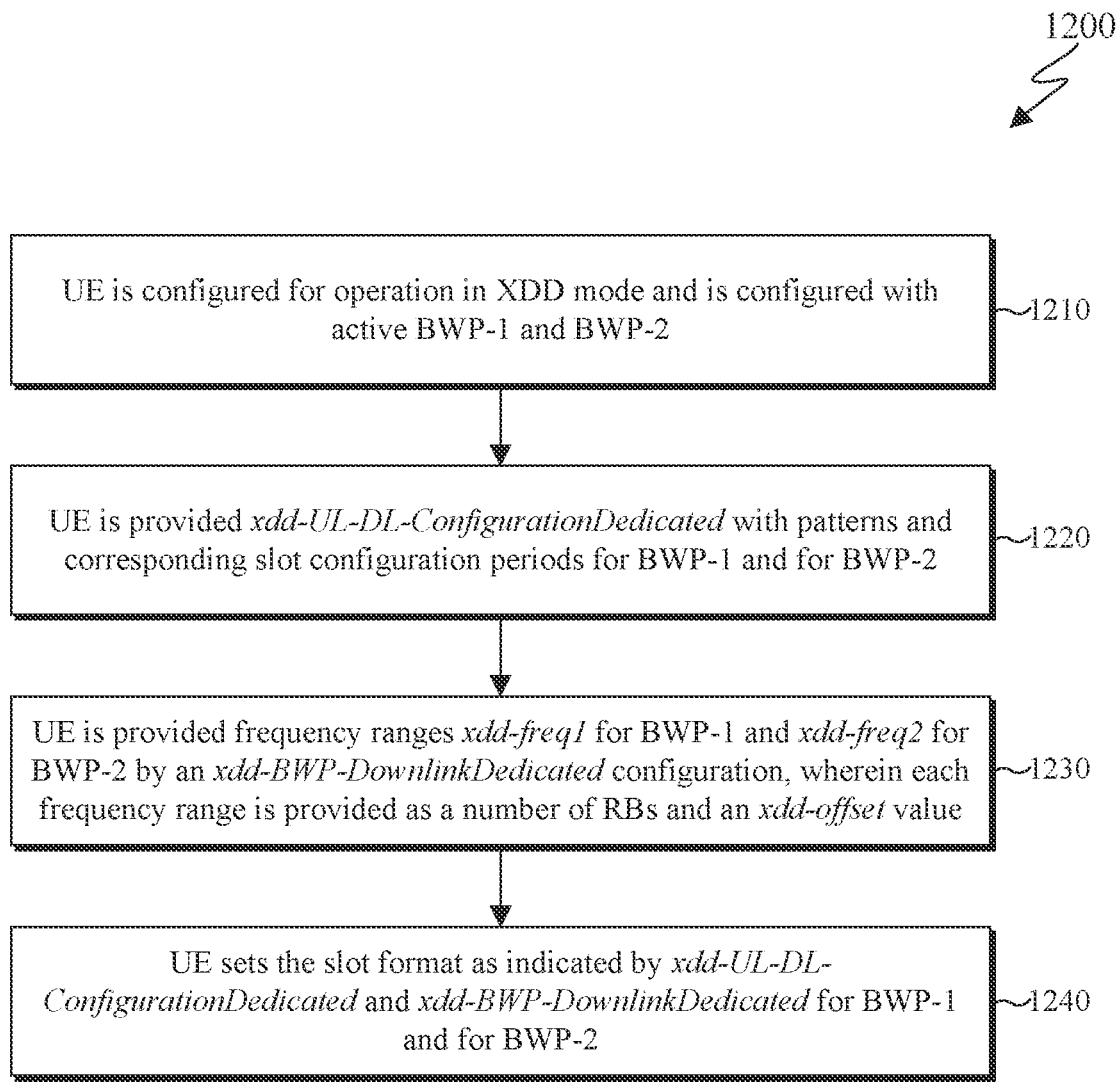

FIGS. 9A-9E illustrate example slot configurations according to embodiments of the present disclosure. FIGS. 10-12 illustrate example methods 1000, 1100, and 12000, respectively, for a UE to determine a slot configuration according to embodiments of the present disclosure. The steps of the method 1000 of FIG. 10, method 1100 of FIG. 11, and method 1200 of FIG. 12 can be performed by any of the UEs 111-119 of FIG. 1, such as the UE 116 of FIG. 3. The methods 1000-1200 and the diagrams of FIGS. 9A-9E are for illustration only and other embodiments can be used without departing from the scope of the present disclosure.

In an NR TDD configuration, more time resources can be allocated to DL than UL which causes a smaller uplink coverage and a larger latency relative to downlink. A configuration that can override downlink symbols is beneficial for uplink coverage enhancement and latency reduction. Thus, a DL slot can be changed to an X slot to allow simultaneous DL and UL operation by using different TDD configurations across different frequency regions of a BWP.

In certain embodiments, when a UE (such as the UE 116) is configured for operation in XDD mode, the UE is provided xdd-UL-DL-ConfigurationDedicated or xdd-UL-DL-ConfigurationCommon.

In certain embodiments, when xdd-UL-DL-ConfigurationDedicated or xdd-UL-DL-ConfigurationCommon is provided, the UE determines DL slot(s) or symbol(s), UL slot(s) or symbol(s), and Flexible slot(s) or symbol(s) as by the signaled configuration.

In certain embodiments, when the UE (such as the UE 116) is provided tdd-UL-DL-ConfigurationCommon and is additionally provided xdd-UL-DL-ConfigurationCommon, the parameter xdd-UL-DL-ConfigurationCommon overrides downlink symbols per slot over the number of slots as provided by tdd-UL-DL-ConfigurationCommon. If the UE is also provided tdd-UL-DL-ConfigurationDedicated, the parameter xdd-UL-DL-ConfigurationCommon overrides downlink symbols per slot over the number of slots as provided by tdd-UL-DL-ConfigurationCommon and tdd-UL-DL-ConfigurationDedicated. Alternatively, or additionally, xdd-UL-DL-ConfigurationCommon can override flexible symbols as XDD symbols. It is also possible that, alternatively or additionally, xdd-UL-DL-ConfigurationCommon can override uplink symbols as XDD symbols.

In certain embodiments, when the UE (such as the UE 116) is provided tdd-UL-DL-ConfigurationCommon and xdd-UL-DL-ConfigurationCommon, the parameter xdd-UL-DL-ConfigurationCommon can override downlink symbols per slot over the number of slots as provided by tdd-UL-DL-ConfigurationCommon as XDD symbols.

In certain embodiments, when the UE (such as the UE 116) is provided tdd-UL-DL-ConfigurationCommon and xdd-UL-DL-ConfigurationCommon, and it is additionally provided xdd-UL-DL-ConfigurationDedicated, the parameter xdd-UL-DL-ConfigurationCommon can override downlink symbols per slot over the number of slots as provided by tdd-UL-DL-ConfigurationCommon as XDD symbols and xdd-UL-DL-ConfigurationDedicated can override downlink symbols per slot over the number of slots as provided by tdd-UL-DL-ConfigurationCommon and tdd-UL-DL-ConfigurationCommon as XDD symbols.

In certain embodiments, when the UE (such as the UE 116) is provided tdd-UL-DL-ConfigurationCommon and is additionally provided xdd-UL-DL-ConfigurationDedicated, the parameter xdd-UL-DL-ConfigurationDedicated overrides downlink symbols per slot over the number of slots as provided by tdd-UL-DL-ConfigurationCommon. If the UE is also provided tdd-UL-DL-ConfigurationDedicated, the parameter xdd-UL-DL-ConfigurationDedicated overrides downlink symbols per slot over the number of slots as provided by tdd-UL-DL-ConfigurationDedicated.

In certain embodiments, when a UE (such as the UE 116) is configured for operation in XDD mode and is provided tdd-UL-DL-ConfigurationCommon with a reference SCS configuration $\mu_{ref}$ and a pattern1 with a slot configuration period P1, the UE can be provided xdd-UL-DL-ConfigurationDedicated or xdd-UL-DL-ConfigurationCommon with a pattern xdd1 and a period p-xdd1 that overrides the $d_{slots}$ downlink slots and the $d_{sym}$ downlink symbols of pattern1/of the tdd-UL-DL-ConfigurationCommon configuration.

In certain embodiments, when a UE (such as the UE 116) is configured for operation in XDD mode and is provided tdd-UL-DL-ConfigurationCommon with patterns pattern1 and pattern2 with slot configuration periods P1 and P2, respectively, the UE can be provided xdd-UL-DL-ConfigurationDedicated or xdd-UL-DL-ConfigurationCommon with a pattern pattern-xdd1 and a pattern pattern-xdd2 with period p-xdd1 and period p-xdd2, respectively. The pattern xdd1 overrides the downlink slots $d_{slots}$ and the $d_{sym}$ downlink symbols of the tdd-UL-DL-ConfigurationCommon configuration for pattern1 with period P1, and pattern xdd2 overrides the downlink slots $d_{slots}$ and the $d_{sym}$ downlink symbols of the tdd-UL-DL-ConfigurationCommon configuration for pattern2 with period P2. The periods p-xdd1 and p-xdd2 of the xdd-UL-DL-ConfigurationDedicated or xdd-UL-DL-ConfigurationCommon configuration may be different. The periods p-xdd1 and p-xdd2 are same as P1 and P2, respectively. The patterns pattern-xdd1 and pattern-xdd2 may be same or different.

In certain embodiments, when a UE (such as the UE 116) is configured for operation in XDD and is configured multiple active BWPs, the UE can be provided tdd-UL-DL-ConfigurationCommon with a reference SCS configuration $\mu_{ref}$ and a pattern1 with a slot configuration period P1 for each BWP. In one example, the UE is configured with 2 active BWPs, BWP-1 and BWP-2, and tdd-UL-DL-ConfigurationCommon provides a reference SCS configuration $\mu_{ref}$-1b and a pattern1-1b with a slot configuration period P1-2b for BWP-1 and a reference SCS configuration $\mu_{ref}$-2b and a pattern1-2b with a slot configuration period P1-2b for BWP-2. The UE is also provided xdd-UL-DL-ConfigurationDedicated or xdd-UL-DL-ConfigurationCommon with a pattern xdd1-1b and a period p-xdd-1b for BWP-1 that overrides the $d_{slots}$ downlink slots and the $d_{sym}$ downlink symbols of pattern1-1b of the tdd-UL-DL-ConfigurationCommon configuration, and pattern xdd1-2b and a period p-xdd1-2b for BWP-2 that overrides the $d_{slots}$ downlink slots and the $d_{sym}$ downlink symbols of pattern1-2b of the tdd-UL-DL-ConfigurationCommon configuration. If more than 2 BWPs are active, for each active BWP, for example for BWP-n, tdd-UL-DL-ConfigurationCommon provides a reference SCS configuration $\mu_{ref}$-nb and a pattern1-nb with a slot configuration period P1-nb, and xdd-UL-DL-ConfigurationDedicated or xdd-UL-DL-ConfigurationCommon provides a pattern xdd1-nb and a period p-xdd1-nb.

In certain embodiments, when a UE (such as the UE 116) is configured for operation in XDD and is configured multiple active BWPs, the UE is provided tdd-UL-DL-ConfigurationCommon with patterns pattern1 and pattern2 with slot configuration periods P1 and P2, respectively, for each BWP. In one example the UE is configured with 2 active BWPs, BWP-1 and BWP-2, and tdd-UL-DL-ConfigurationCommon provides pattern1-1b and pattern2-1b with slot configuration periods P1-1b and P2-1b for BWP-1, and pattern1-2b and pattern2-2b with slot configuration periods P1-2b and P2-2b for BWP-2. The UE is also provided xdd-UL-DL-ConfigurationDedicated or xdd-UL-DL-ConfigurationCommon with pattern xdd1-1b and pattern xdd2-1b with slot configuration periods p-xdd1-1b and p-xdd2-1b for BWP1 that override the $d_{slots}$ downlink slots and the $d_{sym}$ downlink symbols of pattern1-1b and pattern2-1b, respectively, of the tdd-UL-DL-ConfigurationCommon configuration, and pattern xdd1-2b and pattern xdd2-2b with slot configuration periods p-xdd1-2b and p-xdd2-2b for BWP-2 that override the $d_{slots}$ downlink slots and the $d_{sym}$ downlink symbols of pattern1-2b and pattern2-2b, respectively, of the tdd-UL-DL-ConfigurationCommon configuration. If more than 2 BWPs are active, for each active BWP, for example for BWP-n, tdd-UL-DL-ConfigurationCommon provides a pattern1-nb with a slot configuration period P1-nb, and xdd-UL-DL-ConfigurationDedicated or xdd-UL-DL-ConfigurationCommon provides a pattern xdd1-nb and a period p-xdd1-nb.

In certain embodiments, when a UE (such as the UE 116) is configured for operation in XDD, the UE can be additionally provided a parameter xdd-UL-Freq that indicates a sub-band of a configured BWP that can be reconfigured by the parameter xdd-UL-DL-ConfigurationDedicated or xdd-UL-DL-ConfigurationCommon. In one example, a full DL slot n as indicated by tdd-UL-DL-ConfigurationCommon is reconfigured as an X slot according to a pattern provided by xdd-UL-DL-ConfigurationDedicated or xdd-UL-DL-ConfigurationCommon, wherein the pattern overrides DL symbols of slot n, and xdd-UL-Freq provides a sub-band of the configured BWP. In slot n the UE can transmit using frequency resources in the sub-band provided by xdd-UL-Freq and/or can receive in the frequency resources of the BWP outside the sub-band provided by xdd-UL-Freq. In another example, for a full DL slot n as indicated by tdd-UL-DL-ConfigurationCommon, xdd-UL-Freq provides a sub-band of a configured BWP, and a pattern of xdd-UL-DL-ConfigurationDedicated or xdd-UL-DL-ConfigurationCommon does not override DL symbols as UL symbols in that slot. Slot n is not reconfigured as an X slot and all frequencies in the configured BWP are used for DL and not affected by the indication of xdd-UL-Freq.

The xdd-UL-Freq parameter provides (i) a range of frequencies xdd-freq that can be reconfigured for UL/DL by a pattern provided by xdd-UL-DL-ConfigurationDedicated or xdd-UL-DL-ConfigurationCommon, (ii) a pattern pattern-xdd-freq, and (iii) a periodicity p-freq. The xdd-UL-Freq parameter can be provided by xdd-UL-DL-ConfigurationDedicated or xdd-UL-DL-ConfigurationCommon, or can be provided in a dedicated DL BWP configuration. For each DL BWP in a set of DL BWPs, the UE is provided xdd-UL-Freq. It is possible that the frequency range provided by xdd-freq is same for all BWPs and the pattern and/or the periodicity is different for the different BWPs. For a BWP, a frequency range provided by xdd-freq can be a set of adjacent sub-carriers, a number of sets of adjacent sub-carriers, a single sub-carrier, or the full BWP. A frequency range information provided by xdd-UL-Freq can be provided as a number of RBs and a corresponding sub-band includes twice the number of RBs indicated by xdd-UL-Freq in the center part of the BWP. It is also possible that the range of frequencies is identified by a parameter indicating a starting position of the bandwidth part $N_{BWP}^{start} = O_{carrier} + RB_{start}$ of the configured BWP and a number of contiguous RBs $N_{BWP}^{size} = L_{RB}$, wherein a value $O_{carrier}$ is provided by offsetToCarrier for the subcarrierSpacing, and an offset $RB_{start}$ and a length $L_{RB}$ is provided by locationAndBandwidth, and additionally identified by a value xdd-offset of number of contiguous RBs defined respect to the starting position of the bandwidth part.

A UE (such as the UE 116) configured for operation in XDD mode and for operation in bandwidth parts (BWPs) of a serving cell, is configured by higher layers for the serving cell a set of XDD bandwidth parts for receptions by the UE (DL BWP set) in one or more of the DL bandwidths by parameter xdd-BWP-Downlink or by parameter xdd-initialDownlinkBWP with a set of parameters configured by xdd-BWP-DownlinkCommon and xdd-BWP-DownlinkDedicated, and a set of XDD BWPs for transmissions by the UE (UL BWP set) in one or more of the UL bandwidths by parameter xdd-BWP-Uplink or by parameter xdd-initialUplinkBWP with a set of parameters configured by xdd-BWP-UplinkCommon and xdd-BWP-UplinkDedicated.

In certain embodiments, if a UE (such as the UE 116) has dedicated BWP configuration in XDD operation, the UE can be provided by xdd-firstActiveDownlinkBWP-Id a first active DL BWP for receptions and by xdd-firstActiveUplinkBWP-Id a first active UL BWP for transmissions on a carrier of the primary cell. It is also possible that the UE is provided by xdd-firstActiveDownlinkBWP-Id-set more than one first active DL BWPs for receptions and is provided by xdd-firstActiveUplinkBWP-Id-set more than one first active UL BWPs for transmissions on a carrier of the primary cell. For unpaired spectrum operation, an XDD DL BWP from the set of configured XDD DL BWPs with index provided by xdd-BWP-Id is linked with an UL BWP from the set of configured UL BWPs with index provided by xdd-BWP-Id when the DL BWP index and the UL BWP index are same.

One motivation to use XDD configurations signaled to the UE by means of xdd-UL-DL-ConfigurationDedicated or xdd-UL-DL-ConfigurationCommon is that signaling overhead and payload size of RRC configuration messages can be reduced which increases link robustness and radio range. A configuration provided by xdd-UL-DL-ConfigurationCommon can be signaled to one or more UEs using DL common control channels such as system information carried in SIB1 or SI messages. Alternatively, an XDD configuration provided by xdd-UL-DL-ConfigurationCommon can be configured by means of UE dedicated signaling using common signaling parameters provided to one or more UE in a first step to enable XDD transmissions and receptions on XDD slot(s) or symbol(s) configured for use by multiple UEs, followed by configuration of additional XDD slot(s) or symbol(s) provided to a UE by means of xdd-UL-DL-ConfigurationDedicated.

Another motivation to use XDD configurations signaled to a UE by means of xdd-UL-DL-ConfigurationCommon is to enable XDD transmissions or receptions in a cell where XDD slot(s) or symbol(s) are available during prolonged periods of time and are infrequently reconfigured by the gNB. An XDD configuration provided by xdd-UL-DL-ConfigurationDedicated can be used to reduce DL monitoring activity and reduced DL power consumption for a UE, for example because XDD slot(s) or symbol(s) known as available for XDD UL transmissions under a UE half-duplex constraint do not need to be monitored by the UE.

Figure 9A:
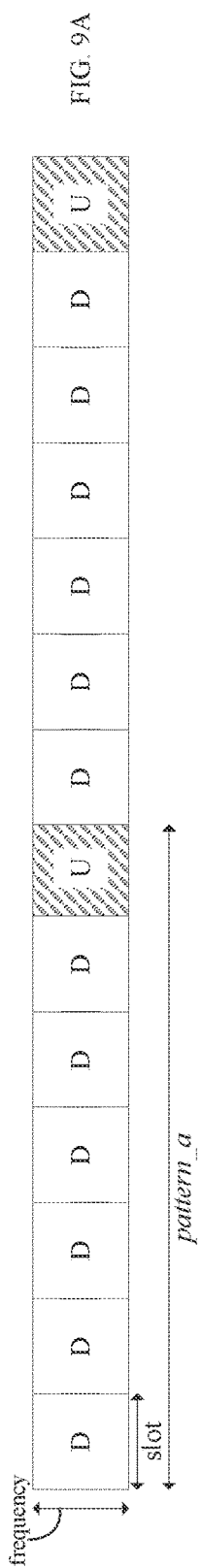
FIGS. 9A-9E illustrate example slot configurations according to embodiments of the present disclosure.

FIGS. 9A-9E illustrates examples of slot configurations according to the disclosure. Slot configuration, as illustrated in FIG. 9A, is provided by tdd-UL-DL-ConfigurationCommon, wherein pattern_a indicates all symbols in slot 1 to slot 6 as DL symbols and all symbols in slot 7 as UL symbols, and repeats a number of times over a number of slots. Configurations as illustrated in FIGS. 9B-9E, are determined by xdd-UL-DL-ConfigurationDedicated that overrides DL symbols per slot over the number of slots as provided by tdd-UL-DL-ConfigurationCommon, and comprises X slots.

Figure 9B:
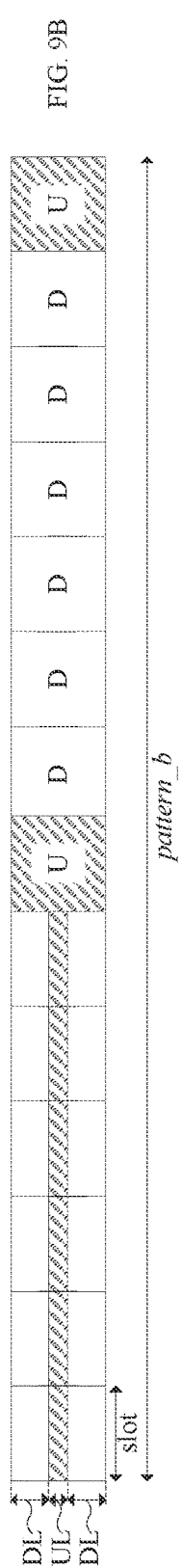
Figure 9C:
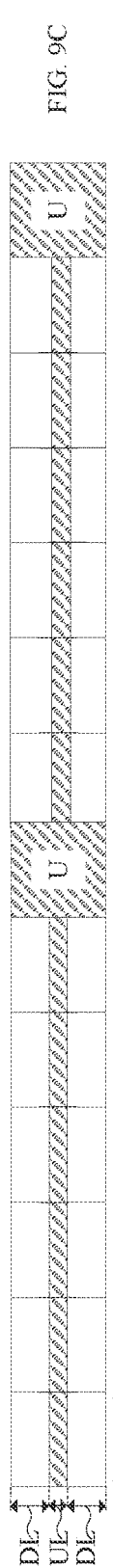

In the configuration as illustrated in FIG. 9B, DL symbols of the first 6 slots are configured as XDD symbols in a pattern of 14 slots as indicated by pattern_b wherein an XDD symbol comprises frequencies for UL and frequencies for DL.

In the configuration as illustrated in FIG. 9B, DL symbols of the first 6 slots are configured as XDD symbols in a pattern of 7 slots as in pattern_c.

Figure 9D:
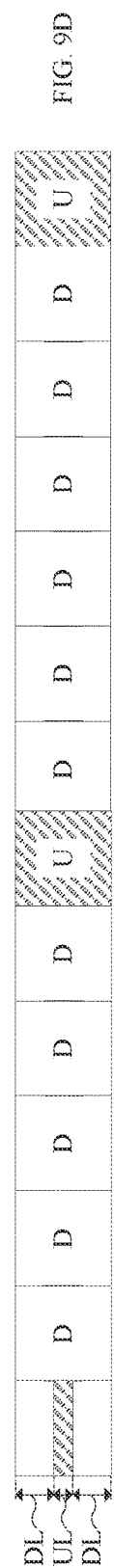

In the configuration, as illustrated in FIG. 9D, all DL symbols of a first slot are configured as XDD symbols in a pattern of 14 slots as in pattern_d.

Figure 9E:
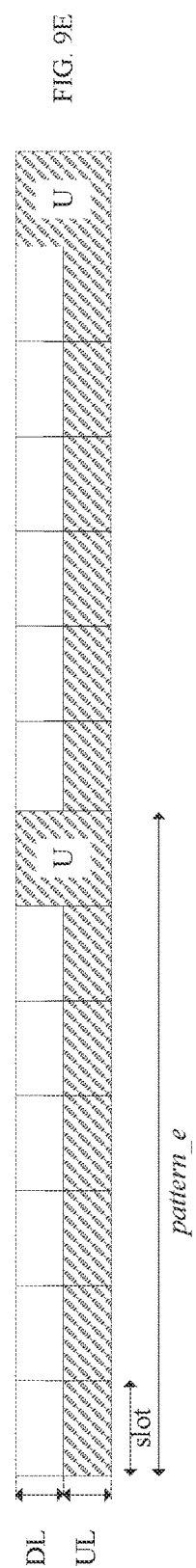

In the configuration, as illustrated in FIG. 9E, DL symbols of the first 6 slots are configured as XDD symbols in a pattern of 7 slots as in pattern_e, wherein an XDD symbol comprises UL and DL frequencies in the lower and upper half of the frequencies of the slot, respectively.

The method 1000, as illustrated in FIG. 10 describes an exemplary procedure for a UE to determine a slot configuration according to the disclosure.

In step 1010, a UE (such as the UE 116) is provided a first configuration by tdd-UL-DL-ConfigurationCommon, and tdd-UL-DL-ConfigurationDedicated if present, over a number of slots. In step 1020, the UE is configured for operation in XDD mode and is provided a second configuration by xdd-UL-DL-ConfigurationCommon over the number of slots. In step 1030, the UE is provided by xdd-Freq frequencies of a DL BWP and/or of an UL BWP that can be reconfigured as UL and/or as DL, respectively, by a pattern provided by xdd-UL-DL-ConfigurationCommon. In step 1040, the UE determines a slot configuration based on the first and second configurations and on xdd-Freq over the number of X slots. In step 1050, the UE transmits and receives according to the determined slot configuration over the number of X slots.

The method 1100, as illustrated in FIG. 11 describes an exemplary procedure for a UE to determine a slot configuration when xdd-UL-DL-ConfigurationDedicated provides with a pattern pattern-xdd1 and a pattern pattern-xdd2 with period p-xdd1 and period p-xdd2, respectively, that override DL symbols of the tdd-UL-DL-ConfigurationCommon configuration according to the disclosure.

In step 1110, a UE (such as the UE 116) is provided tdd-UL-DL-ConfigurationCommon with patterns pattern1 and pattern2 with slot configuration periods P1 and P2, respectively. In step 1120, the UE is provided xdd-UL-DL-ConfigurationDedicated with pattern-xdd1 and pattern-xdd2 with slot configuration periods p-xdd1 and period p-xdd2, respectively. In step 1130, the UE sets the slot format as indicated by patterns pattern-xdd1 and pattern-xdd2 that override DL symbols of the tdd-UL-DL-ConfigurationCommon configuration for pattern1 and pattern2, respectively.

The method 1200, as illustrated in FIG. 12 describes an exemplary procedure for a UE to determine a slot configuration when the UE is configured with multiple active BWPs and is provided a frequency range xdd-freq by a BWP configuration according to the disclosure.

In step 1210, a UE (such as the UE 116) A UE is configured for operation in XDD mode and is configured with active BWP-1 and BWP-2. In step 1220, the UE is provided xdd-UL-DL-ConfigurationDedicated with patterns and corresponding slot configuration periods for BWP-1 and for BWP-2. In step 1230, the UE is provided frequency ranges xdd-freq1 for BWP-1 and xdd-freq2 for BWP-2 by an xdd-BWP-DownlinkDedicated configuration, wherein each frequency range is provided as a number of RBs and an xdd-offset value. In step 1240, the UE sets the slot format as indicated by xdd-UL-DL-ConfigurationDedicated and xdd-BWP-DownlinkDedicated for BWP-1 and for BWP-2.

Although FIGS. 9A-9E illustrate various slot configurations, FIG. 10 illustrates the method 1000, FIG. 11 illustrates the method 1100, and FIG. 12 illustrates the method 1200 various changes may be made to FIGS. 9A-*12. For example, while the methods 1000-1200 are shown as a series of steps, various steps could overlap, occur in parallel, occur in a different order, or occur multiple times. In another example, steps may be omitted or replaced by other steps. For example, steps of the method 1000, the method 1100, and the method 1200 can be executed in a different order.

Embodiments of the present disclosure also describe configurations that overrides uplink symbols as XDD symbols. This is described in the following examples and embodiments, such as those of FIGS. 13 and 14.

Figure 13:
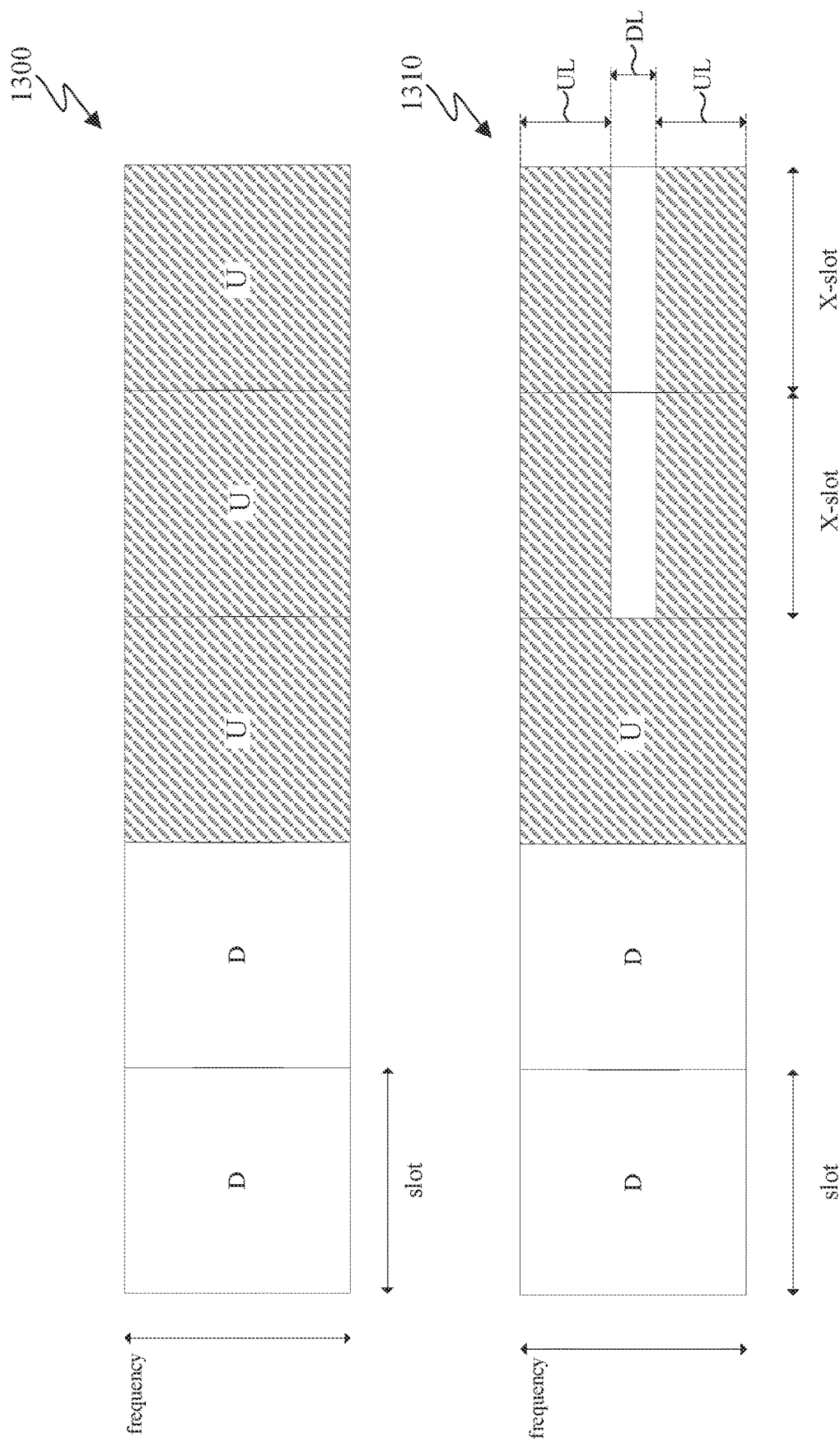
FIG. 13 illustrates example slot configurations according to embodiments of the present disclosure.
Figure 14:
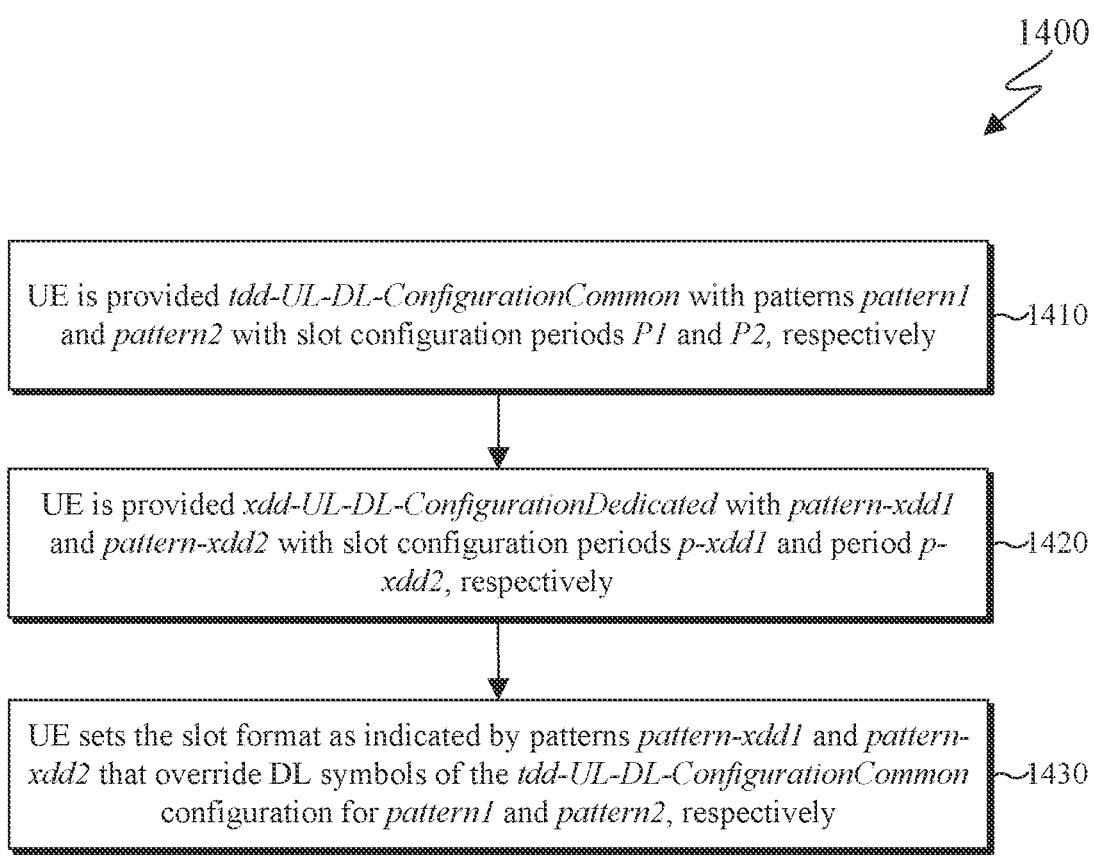
FIG. 14 illustrates an example method for a UE to determine a slot configuration according to embodiments of the present disclosure.

FIG. 13 illustrates example slot configurations 1300 and 1310 according to embodiments of the present disclosure. FIG. 14 illustrates an example method 1400 for a UE to determine a slot configuration according to embodiments of the present disclosure. The steps of the method 1400 of FIG. 14 can be performed by any of the UEs 111-119 of FIG. 1, such as the UE 116 of FIG. 3. The method 1400 and the diagram of FIG. 13 are for illustration only and other embodiments can be used without departing from the scope of the present disclosure.

In an NR TDD configuration although more time resources can be allocated to DL than UL due to a higher DL traffic, there may be a need for a UE to receive in slots that are UL slots, for example for a periodic monitoring of a channel or signal. A configuration that can override uplink symbols can then be beneficial and an UL slot can be changed to an X slot to allow simultaneous DL and UL operation by using different TDD configurations across different frequency regions of a BWP.

In certain embodiments, when a UE (such as the UE 116) is configured for operation in XDD mode and is provided xdd-UL-DL-ConfigurationDedicated, the parameter xdd-UL-DL-ConfigurationDedicated can override the $u_{slots}$ uplink slots and the $u_{sym}$ uplink symbols as provided by tdd-UL-DL-ConfigurationCommon. If the UE is also provided tdd-UL-DL-ConfigurationDedicated, the parameter xdd-UL-DL-ConfigurationDedicated overrides uplink symbols per slot over the number of slots as provided by tdd-UL-DL-ConfigurationDedicated. The parameter xdd-UL-DL-ConfigurationDedicated can provide one or two patterns with corresponding slot configuration periods, and when configured with multiple active BWPs, can provide patterns and corresponding slot configuration periods for each BWP.

In certain embodiments, when a UE (such as the UE 116) is configured for operation in XDD, the UE can be additionally provided a parameter xdd-DL-Freq that indicates a sub-band of a configured BWP that can be reconfigured by the parameter xdd-UL-DL-ConfigurationDedicated. The xdd-DL-Freq parameter provides (a) a range of frequencies xdd-freq that can be reconfigured for UL/DL by a pattern provided by xdd-UL-DL-ConfigurationDedicated, (b) a pattern pattern-xdd-freq and (c) a periodicity p-freq. The xdd-DL-Freq parameter can be provided by xdd-UL-DL-ConfigurationDedicated, or can be provided in a dedicated UL BWP configuration. For each UL BWP in a set of UL BWPs, the UE is provided xdd-UL-Freq. It is possible that the frequency range provided by xdd-freq is same for all BWPs and the pattern and/or the periodicity is different for the different BWPs. For a BWP, a frequency range provided by xdd-freq can be a set of adjacent sub-carriers, a number of sets of adjacent sub-carriers, a single sub-carrier, or the full BWP. A frequency range information provided by xdd-DL-Freq can be provided as a number of RBs and a corresponding sub-band includes twice the number of RBs indicated by xdd-DL-Freq in the center part of the BWP. It is also possible that the range of frequencies is identified using the parameter $N_{BWP}^{start}=O_{carrier}+RB_{start}$ of the configured BWP and an additional xdd-offset value in number of RBs with respect to the subcarrier where the BWP starts.

FIG. 13 illustrates an example of a slot configuration according to the disclosure. Slot configuration 1300 DDUUU is provided by tdd-UL-DL-ConfigurationCommon parameter, and slot configuration 1310 DDUXX is determined by an xdd-UL-DL-ConfigurationDedicated configuration that overrides UL symbols and comprises X slots.

The method 1400, as illustrated in FIG. 14 describes illustrates a procedure for a UE to determine a slot configuration when xdd-UL-DL-ConfigurationDedicated provides a pattern pattern-xdd1 and a pattern pattern-xdd2 with period p-xdd1 and period p-xdd2, respectively, that override UL symbols of the tdd-UL-DL-ConfigurationCommon configuration according to the disclosure.

In step 1410, a UE (such as the UE 116) is provided tdd-UL-DL-ConfigurationCommon with patterns pattern1 and pattern2 with slot configuration periods P1 and P2, respectively. In step 1420, the UE is provided xdd-UL-DL-ConfigurationDedicated with pattern-xdd1 and pattern-xdd2 with slot configuration periods p-xdd1 and period p-xdd2, respectively. In step 1430, the UE sets the slot format as indicated by pattern-xdd1 and pattern-xdd2 that override UL symbols of the tdd-UL-DL-ConfigurationCommon configuration for pattern1 and pattern2, respectively. In step 1440, the UE transmits in the determined X slots.

Although FIG. 13 illustrates example slot configurations 1300 and 1310 and FIG. 14 illustrates the method 1400 various changes may be made to FIGS. 13 and 14. For example, while the method 1400 is shown as a series of steps, various steps could overlap, occur in parallel, occur in a different order, or occur multiple times. In another example, steps may be omitted or replaced by other steps. For example, steps of the method 1400 can be executed in a different order.

Embodiments of the present disclosure also describe configurations that overrides downlink/uplink symbols as XDD symbols. This is described in the following examples and embodiments, such as those of FIG. 15.

Figure 15:
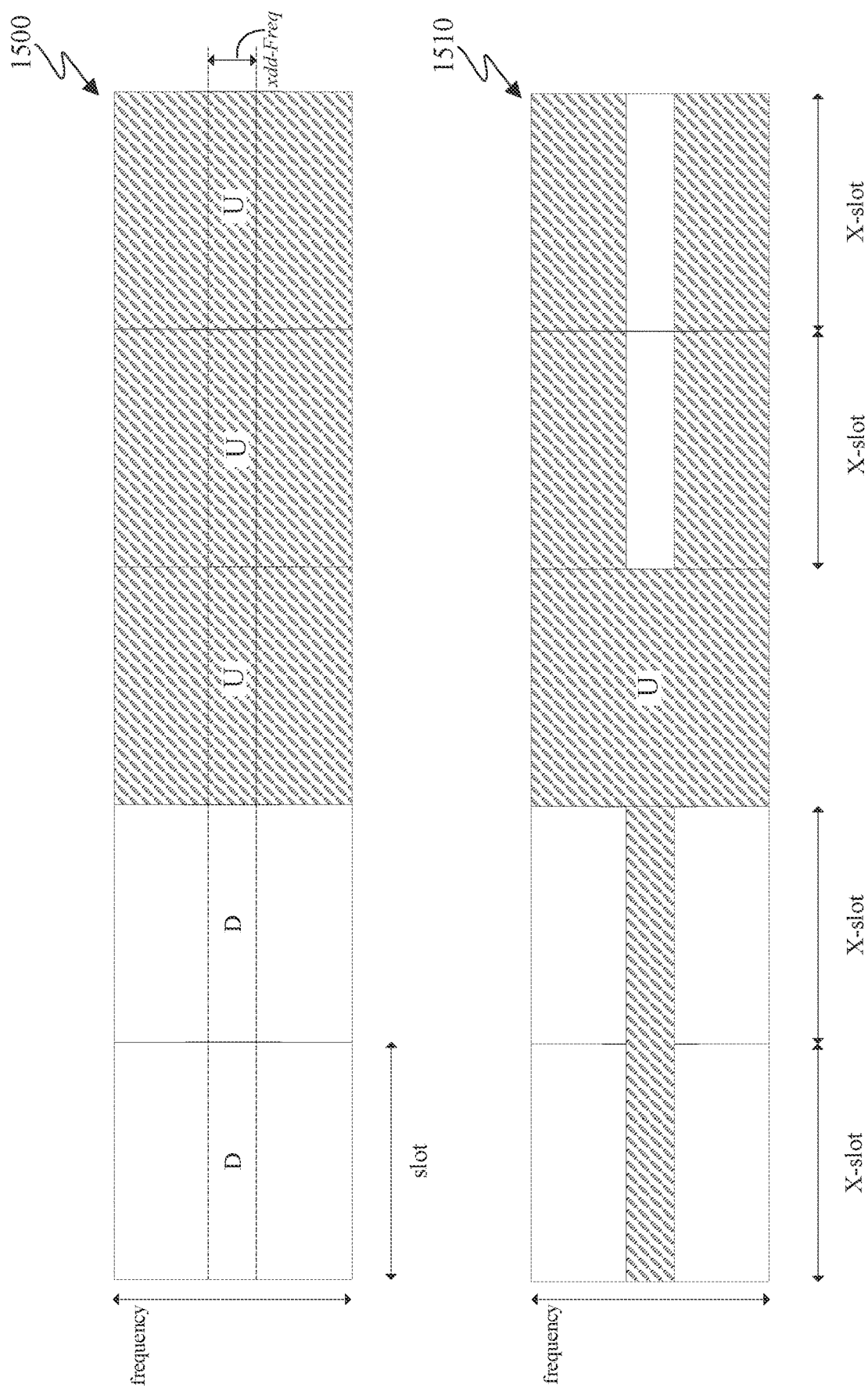
FIG. 15 illustrates example slot configurations according to embodiments of the present disclosure.

FIG. 15 illustrates example slot configurations 1500 and 1510 according to embodiments of the present disclosure. The diagrams of FIG. 15 are for illustration only and other embodiments can be used without departing from the scope of the present disclosure. Although FIG. 15 illustrates example slot configurations 1500 and 1510 various changes may be made to FIG. 15.

In certain embodiments, when a UE (such as the UE 116) is configured for operation in XDD mode, the UE can be provided xdd-UL-DL-ConfigurationDedicated and a xdd-UL-Freq parameter that provides the frequency range of a BWP that can be used for UL in a symbol configured as DL symbol by tdd-UL-DL-ConfigurationCommon (and by tdd-UL-DL-ConfigurationDedicated, if present), and xdd-DL-Freq parameter that provides the frequency range of a BWP that can be used for DL in a symbol configured as UL symbol by tdd-UL-DL-ConfigurationCommon (and by tdd-UL-DL-ConfigurationDedicated, if present). Frequency ranges that can be used for UL or DL in a symbol that is configured as DL or UL, respectively, can be same or different. It is also possible that the UE is provided one parameter xdd-Freq that indicates a frequency range that can be reconfigured by xdd-UL-DL-ConfigurationDedicated over a number of slots. The parameter xdd-UL-DL-ConfigurationDedicated overrides downlink and uplink symbols.

FIG. 15 illustrates an example of a slot configuration according to the disclosure. Slot configuration 1500 DDUUU is provided by tdd-UL-DL-ConfigurationCommon parameter, and slot configuration 1510 DDUXX is determined by an xdd-UL-DL-ConfigurationDedicated configuration that that overrides DL and UL symbols.

A symbol configured as a flexible symbol by tdd-UL-DL-ConfigurationCommon can be configured by xdd-UL-DL-ConfigurationDedicated as an UL or DL or X symbol depending on the frequency range of a BWP that can be reconfigured. It is also possible that xdd-UL-DL-ConfigurationDedicated does not override a flexible symbol. For example, in a configuration by xdd-UL-DL-ConfigurationDedicated a first symbol is an X symbol, a second symbol is an F symbol and a third symbol is an UL symbol. When a UE transmits in a sub-band of the first X symbol, the second F symbol can be scheduled for UL. When a UE receives in a sub-band of the first X symbol, the second symbol can be for DL/UL switching and the UE may not expect to either transmit or receive in the second F symbol.

Embodiments of the present disclosure also describe enabling XDD in downlink, uplink, or both uplink and downlink. This is described in the following examples and embodiments, such as those of FIGS. 16 and 17.

Figure 16:
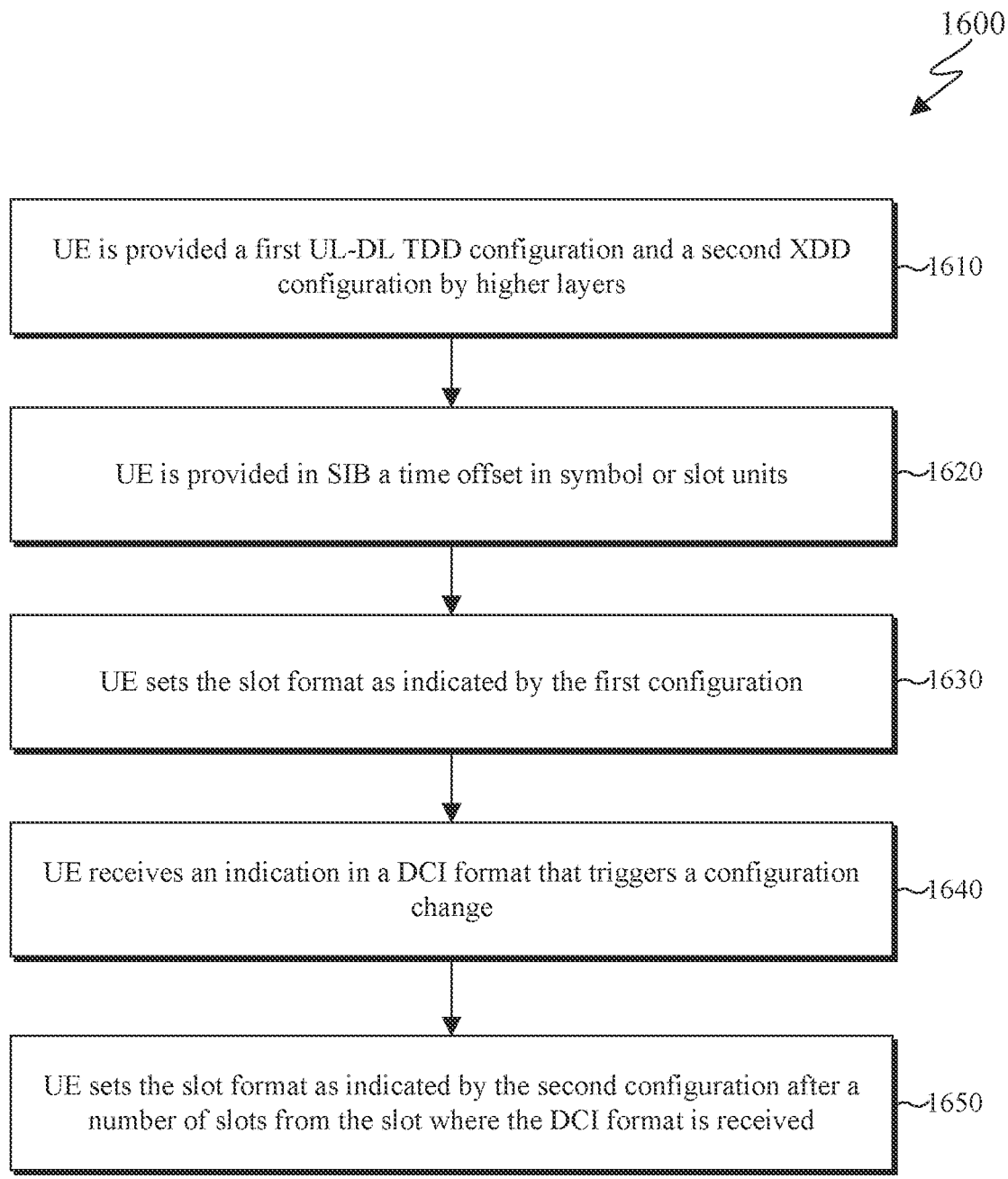
FIGS. 16 and 17 illustrate example methods for a UE to determine a slot configuration according to embodiments of the present disclosure.
Figure 17:
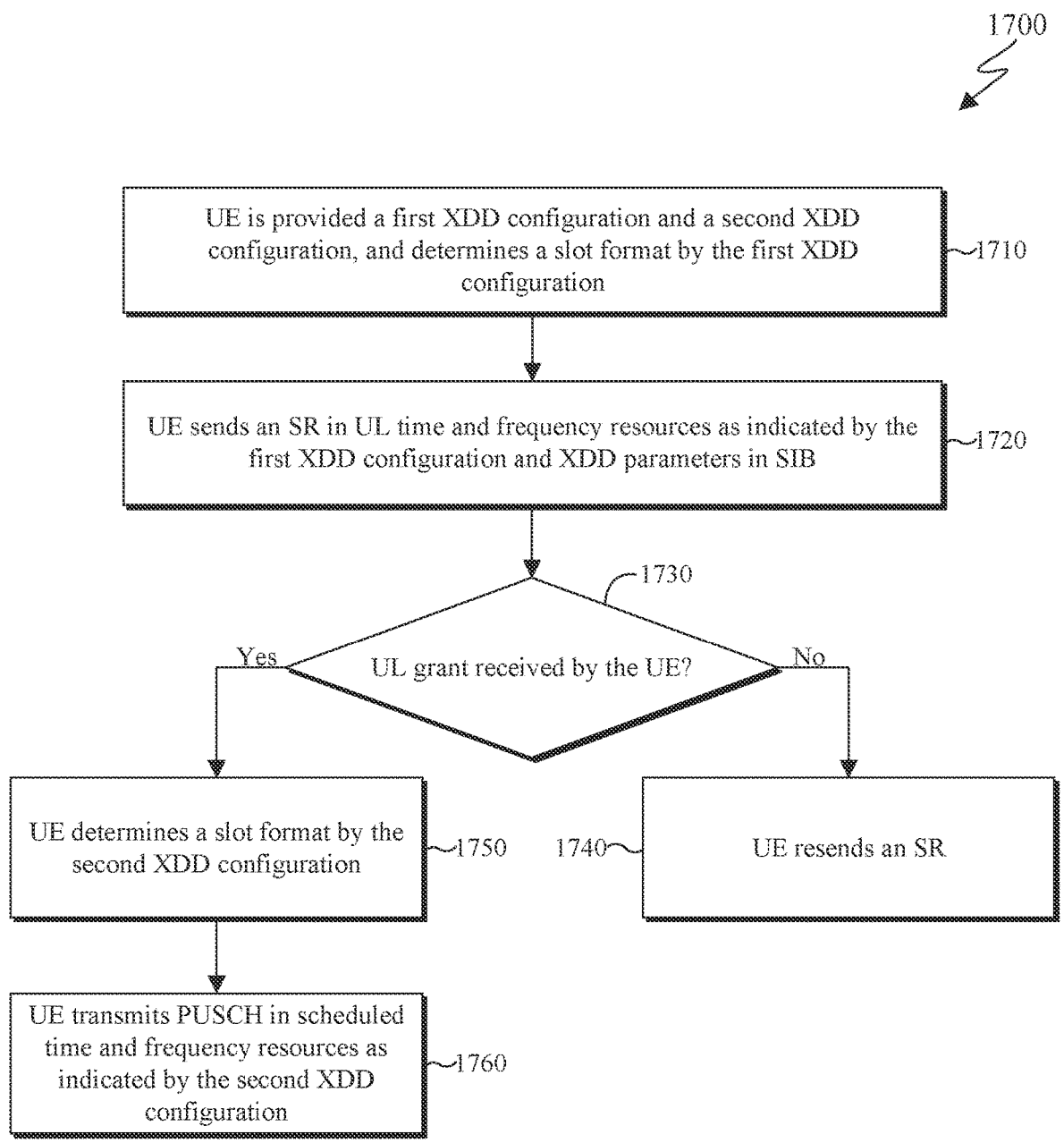

FIGS. 16 and 17 illustrate example methods for a UE to determine a slot configuration according to embodiments of the present disclosure. The steps of the method 1600 of FIG. 16 and the method 1700 of FIG. 17 can be performed by any of the UEs 111-119 of FIG. 1, such as the UE 116 of FIG. 3. The methods 1600 and 1700 are for illustration only and other embodiments can be used without departing from the scope of the present disclosure.

In certain embodiments, when a UE (such as the UE 116) is configured for operation in XDD mode and is provided xdd-UL-DL-ConfigurationDedicated, the parameter xdd-UL-DL-ConfigurationDedicated can override downlink symbols, uplink symbols, and flexible symbols per slot over the number of slots as provided by tdd-UL-DL-ConfigurationCommon. The UE can be provided parameters xdd-UL-Freq and xdd-DL-Freq that indicate the portion of a configured DL BWP that can be configured as UL and the portion of a configured UL BWP that can be configured as DL, respectively, by xdd-UL-DL-ConfigurationDedicated. Alternatively, a UE can be provided a single parameter xdd-Freq that indicates a portion of a configured BWP that can be reconfigured as UL or DL by xdd-UL-DL-ConfigurationDedicated.

In certain embodiments, a UE (such as the UE 116) can be configured a parameter that indicates whether only downlink or only uplink symbols can be overridden by xdd-UL-DL-ConfigurationDedicated or by xdd-UL-DL-ConfigurationCommon if an XDD or full-duplex configuration is enabled or disabled for either one UE, a group of UEs, or all UEs in a cell. The parameter value is provided by higher layers such as by a SIB, or by other common RRC signaling, or by UE-specific RRC signaling. There can be one or more parameter value(s) associated with the signaling indication to start, or stop, or switch the configuration associated with XDD mode.

In certain embodiments, a UE (such as the UE 116) can be indicated by a DCI format whether only downlink or only uplink symbols can be overridden by xdd-UL-DL-ConfigurationDedicated or by xdd-UL-DL-ConfigurationCommon.

In certain embodiments, a UE (such as the UE 116) can be indicated by a DCI format to start or stop operating in XDD mode or to switch the configuration associated with XDD mode. When the indication is to start operating in XDD mode, the UE sets the slot format as indicated by tdd-UL-DL-ConfigurationCommon (and tdd-UL-DL-ConfigurationDedicated, if present) and xdd-UL-DL-ConfigurationDedicated or xdd-UL-DL-ConfigurationCommon starting from a determined slot. When the indication is to stop operating in XDD mode, the UE sets the slot format as indicated by tdd-UL-DL-ConfigurationCommon (and tdd-UL-DL-ConfigurationDedicated, if present) starting from a determined slot. When the indication is to switch the configuration associated with XDD mode, the UE sets the slot format as indicated by tdd-UL-DL-ConfigurationCommon (and tdd-UL-DL-ConfigurationDedicated, if present) and xdd-UL-DL-ConfigurationDedicated or xdd-UL-DL-ConfigurationCommon starting from a determined slot.

In certain embodiments, a UE (such as the UE 116) can be indicated by a MAC control element (CE) to start or stop operating in XDD mode or to switch the configuration associated with XDD mode. When the indication is to start, or to stop, or to switch a configuration associated with XDD mode, the UE starts, or stops, or switches the slot format from a determined slot. In one example, a MAC CE carrying a signaling indication to start, or stop, or switch an XDD configuration can be placed in a MAC protocol data unit (PDU) and indicated through a MAC sub-header or indicated through a MAC sub-PDU. The MAC CE may be a bit string that is byte aligned in length. Different types of MAC CEs may be used for activation, de-activation, or switching of the configuration associated with XDD mode. For example, a first MAC CE is used to activate, such as enable or start operating XDD mode or an XDD configuration, and a second MAC CE is used to de-activate, such enable or stop operating XDD mode or an XDD configuration. In another example, a single MAC CE indicates one or a combination of the following, start, or stop, or change of a configuration associated with XDD mode. The MAC CE signaling indication may be associated with a predetermined, such as a MAC CE application delay as described in REF 3, or configurable activation or deactivation time, such as at an end of a current or next UL-DL configuration period. The signaling indication may be associated with an index set selecting one or more tabulated or fixed in system specification or RRC configured parameter sets.

In certain embodiments, when a gNB (such as the BS 102) provides multiple slot configurations to a UE, wherein a configuration can be an UL-DL TDD configuration by tdd-UL-DL-ConfigurationCommon (and tdd-UL-DL-ConfigurationDedicated, if present) or an XDD configuration by xdd-UL-DL-ConfigurationDedicated or by xdd-UL-DL-ConfigurationCommon, the gNB can provide an indication in a DCI format to the UE to change a configuration, wherein the configuration can be an UL-DL TDD configuration, or an XDD configuration with a first pattern, or an XDD configuration with a second pattern, or an XDD configuration with an uplink sub-band, or a downlink sub-band or both. Depending on the DL and UL traffic, a gNB can indicate to use another configuration to efficiently handle asymmetric DL and UL traffic. A default configuration can be an UL-DL TDD configuration and, after receiving an indication the UE uses an XDD configuration over a configured/indicated number of slots. It is also possible that the indication by the gNB triggers a configuration change between two XDD configurations or two patterns of an XDD configuration. For example, an XDD configuration provides a first pattern that comprises one or a first number of X slots over a number of slots, and a second pattern that comprises a second number of X slots, that is for example larger than the first number of slots, over the number of slots. The first XDD pattern allows a UE to transmit a Scheduling Request (SR) to request a gNB to allocate resource for a PUSCH transmission, when needed, while the pattern assigns the majority of the resources to DL because of high downlink traffic. The second XDD pattern allows a UE to transmit when a gNB allocates resource for a PUSCH transmission. For example, a UE is configured a first pattern pattern_d of FIG. 7 and then is indicated to change to a second pattern pattern_c of FIG. 7 for a number of slots before changing back to pattern_d. It is also possible that after changing from pattern_d to pattern_c, pattern_c remains valid until the UE receives another indication to change back to pattern_d or to a different pattern.

The indication of a configuration change can be in a DCI format or in an UL grant. The indication can be a 1-bit indication in a DCI format that indicates to switch between an UL-DL TDD configuration and an XDD configuration, or between two XDD configurations, or between patterns of a same configuration. When a number of configurations or a number of patterns of one or more configurations are possible, the indication can comprise 2 or more bits. It is also possible that a UE can use only some of the configurations or patterns as signaled in a bitmap in SIB. For example, a gNB configures 4 patterns for XDD operation, and a bitmap of 4 bits in SIB '1 0 1 0' indicates that first and third patterns are active. When a UE is configured a UL-DL TDD configuration and receives a 1-bit indication in a DCI format to change to an XDD configuration, the value of the 1-bit indication indicates the pattern to use among the active patterns. A value of 0 can indicate the first pattern and a value of 1 can indicate the third pattern. In another example a 1-bit indication in a DCI format indicates a change from an UL-DL TDD configuration to an XDD configuration, and a bitmap in SIB indicates an XDD pattern, wherein the bitmap indicates one pattern among the possible patterns (e.g., '1 0 0 0'). When a gNB indicates to a UE a configuration change from a first configuration to a second configuration in a DCI format, the UE sets the slot format as indicated by the second configuration after a time period of a number of symbols or a number of slots from the last symbol or the last slot, respectively, where the UE receives the DCI format, wherein the time period is indicated in a SIB.

The method 1600, as illustrated in FIG. 16 illustrates an exemplary procedure for a UE (such as the UE 116) to determine a slot configuration when an indication in a DCI format triggers a configuration change according to the disclosure.

In step 1610, a UE (such as the UE 116) is provided a first UL-DL TDD configuration and a second XDD configuration by higher layers. In step 1620, the UE is provided in SIB a time offset in symbol or slot units. In step 1630, the UE sets the slot format as indicated by the first configuration. In step 1640, the UE receives an indication in a DCI format that triggers a configuration change. In step 1650, the UE sets the slot format as indicated by the second configuration after a number of slots from the slot where the UE receives the DCI format.

The method 1700, as illustrated in FIG. 17 illustrates an exemplary procedure for a UE to determine UL symbols for a PUSCH transmission when an UL grant triggers a change to another slot configuration according to the disclosure.

In step 1710, a UE (such as the UE 116) is provided a first XDD configuration and a second XDD configuration and determines a slot format by the first configuration. In step 1720, the UE transmits an SR in UL time and frequency resources as indicated by the first configuration and XDD parameters in SIB. In step 1730, the UE determines whether UL grant was received. If the UE does not receive an UL grant (as determined in step 1730), the UE in step 1740 retransmits an SR. Alternatively, if the UE do receive an UL grant (as determined in step 1730), the UE in step 1750 determines the slot format from the second configuration. Thereafter, the UE in step 1760 transmits PUSCH in scheduled time and frequency resources of the second configuration.

Although FIG. 16 illustrates the method 1600 and FIG. 17 illustrates the method 1700 various changes may be made to FIGS. 16 and 17. For example, while the methods 1600 and 1700 are shown as a series of steps, various steps could overlap, occur in parallel, occur in a different order, or occur multiple times. In another example, steps may be omitted or replaced by other steps. For example, steps of the method 1600 and the sets of the method 1700 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive, for a cell:
first information indicating first slots with uplink (UL), downlink (DL), or flexible (F) symbols associated with a first bandwidth (BW), and
second information indicating second slots with UL, DL, or F symbols associated with a second BW, wherein the second slots are a subset of the first slots; and
a processor operably coupled to the transceiver, the processor configured to determine:
a first direction for a first set of symbols of the first slots based on the first information, and
a second direction for a second set of symbols of the second slots based on the first information and the second information, wherein:
the transceiver is further configured to:
transmit or receive over the first set of symbols or over the second set of symbols, and
receive information for:
a first frequency offset from a reference frequency to a first resource block (RB) of the first BW,
a first length of a first number of RBs indicating RBs of the first BW,
a second frequency offset from the reference frequency to a first RB of the second BW, and
a second length of a second number of RBs indicating RBs of the second BW, and
the processor is further configured to determine the second direction for the second set of symbols associated with RBs of the second BW.

2. The UE of claim 1, wherein:
the transceiver is further configured to simultaneously transmit and receive during a same number of symbols from the first set of symbols and from the second set of symbols, and
wherein:
the first direction and the second direction are either DL or UL,
the first direction is DL and the second direction is UL, or
the first direction is UL and the second direction is DL.

3. The UE of claim 1, wherein:
the first BW comprises a first set of RBs and the second BW comprises a second set of RBs, wherein the first set of RBs includes the second set of RBs; and
the transceiver is further configured to transmit or receive over the first set of symbols using RBs from the first set of RBs and over the second set of symbols using RBs from the second set of RBs.

4. The UE of claim 1, wherein the transceiver is further configured to receive a downlink control information (DCI) format indicating a first symbol from the second set of symbols.

5. The UE of claim 1, wherein the transceiver is further configured to receive:
the first information by a system information block, and
the second information by UE-specific radio resource control signaling.

6. The UE of claim 1, wherein:
the second BW is an initial DL BW for receptions or an initial UL BW for transmissions, or
the second BW is a next BW, after the initial DL or UL BW, used for receptions or transmissions.

7. A base station (BS) comprising:
a transceiver configured to transmit, for a cell:
first information indicating first slots with uplink (UL), downlink (DL), or flexible (F) symbols associated with a first bandwidth (BW), and
second information indicating second slots with UL, DL, or F symbols associated with a second BW, wherein the second slots are a subset of the first slots; and
a processor operably coupled to the transceiver, the processor configured to determine:
a first direction for a first set of symbols of the first slots based on the first information, and
a second direction for a second set of symbols of the second slots based on the first information and the second information, wherein:
the transceiver is further configured to:
receive or transmit over the first set of symbols or over the second set of symbols, and
transmit information for:
a first frequency offset from a reference frequency to a first resource block (RB) of the first BW,
a first length of a first number of RBs indicating RBs of the first BW,
a second frequency offset from the reference frequency to a first RB of the second BW, and
a second length of a second number of RBs indicating RBs of the second BW, and
the processor is further configured to determine the second direction for the second set of symbols associated with RBs of the second BW.

8. The BS of claim 7, wherein:
the transceiver is further configured to simultaneously receive and transmit during a same number of symbols from the first set of symbols and from the second set of symbols, and
wherein:
the first direction and the second direction are either DL or UL,
the first direction is DL and the second direction is UL, or
the first direction is UL and the second direction is DL.

9. The BS of claim 7, wherein:
the first BW comprises a first set of RBs and the second BW comprises a second set of RBs, wherein the first set of RBs includes the second set of RBs; and
the transceiver is further configured to receive or transmit over the first set of symbols using RBs from the first set of RBs and over the second set of symbols using RBs from the second set of RBs.

10. The BS of claim 7, wherein the transceiver is further configured to transmit a downlink control information (DCI) format indicating a first symbol from the second set of symbols.

11. The BS of claim 7, wherein the transceiver is further configured to transmit:
the first information by a system information block, and
the second information by UE-specific radio resource control signaling.

12. A method comprising:
receiving, for a cell:
first information indicating first slots with uplink (UL), downlink (DL), or flexible (F) symbols associated with a first bandwidth (BW), and
second information indicating second slots with UL, DL, or F symbols associated with a second BW, wherein the second slots are a subset of the first slots;
determining:
a first direction for a first set of symbols of the first slots based on the first information, and
a second direction for a second set of symbols of the second slots based on the first information and the second information;
transmitting or receiving over the first set of symbols or over the second set of symbols;
receiving information for:
a first frequency offset from a reference frequency to a first resource block (RB) of the first BW,
a first length of a first number of RBs indicating RBs of the first BW,
a second frequency offset from the reference frequency to a first RB of the second BW, and a second length of a second number of RBs indicating RBs of the second BW; and determining the second direction for the second set of symbols associated with RBs of the second BW.

13. The method of claim 12, wherein transmitting or receiving over the first set of symbols and over the second set of symbols comprises simultaneously transmitting and receiving during a same number of symbols from the first set of symbols and from the second set of symbols, and wherein:

the first direction and the second direction are either DL or UL, the first direction is DL and the second direction is UL, or the first direction is UL and the second direction is DL.

14. The method of claim 12, wherein:

the first BW comprises a first set of RBs and the second BW comprises a second set of RBs, wherein the first set of RBs includes the second set of RBs; and transmitting or receiving over the first set of symbols and over the second set of symbols comprises transmitting or receiving over the first set of symbols using RBs from the first set of RBs and over the second set of symbols using RBs from the second set of RBs.

15. The method of claim 12, further comprising receiving a downlink control information (DCI) format indicating a first symbol from the second set of symbols.

16. The method of claim 12, wherein:

receiving the first information comprises receiving the first information by a system information block, and receiving the second information comprises receiving the second information by UE-specific radio resource control signaling.

17. The method of claim 12, wherein:

the second BW is an initial DL BW for receptions or an initial UL BW for transmissions, or the second BW is a next BW, after the initial DL or UL BW, used for receptions or transmissions.

* * * * *